US010100223B2

(12) United States Patent
Jeffries et al.

(10) Patent No.: US 10,100,223 B2
(45) Date of Patent: Oct. 16, 2018

(54) METHODS FOR MAKING ELASTOMERS, ELASTOMER COMPOSITIONS AND RELATED ELASTOMERS

(71) Applicant: ALLNEX IP S.À.R.L., Luxembourg (LU)

(72) Inventors: Michael Jeffries, Follansbee, WV (US); Myron Shaffer, New Cumberland, WV (US); Charles Gambino, Mc Donald, PA (US); Christine Mebane, Braddock, PA (US); Michael Dvorchak, Monroeville, PA (US)

(73) Assignee: ALLNEX NETHERLANDS B.V., Bergen op Zoom (NL)

( * ) Notice: Subject to any disclaimer, the term of this patent is extended or adjusted under 35 U.S.C. 154(b) by 314 days.

(21) Appl. No.: 14/770,280

(22) PCT Filed: Mar. 10, 2014

(86) PCT No.: PCT/EP2014/054591
§ 371 (c)(1),
(2) Date: Aug. 25, 2015

(87) PCT Pub. No.: WO2014/139954
PCT Pub. Date: Sep. 18, 2014

(65) Prior Publication Data
US 2016/0002497 A1    Jan. 7, 2016

Related U.S. Application Data

(63) Continuation-in-part of application No. 14/012,027, filed on Aug. 28, 2013.

(60) Provisional application No. 61/782,541, filed on Mar. 14, 2013.

(51) Int. Cl.
| | | |
|---|---|---|
| *C08J 5/18* | (2006.01) | |
| *C08F 290/06* | (2006.01) | |
| *C09D 175/16* | (2006.01) | |
| *B29C 41/00* | (2006.01) | |
| *B29C 41/02* | (2006.01) | |
| *B29C 35/08* | (2006.01) | |
| *C08G 18/73* | (2006.01) | |
| *C08G 18/75* | (2006.01) | |
| *C08G 18/78* | (2006.01) | |
| *C09D 5/20* | (2006.01) | |
| *C08L 75/04* | (2006.01) | |
| *B24B 37/24* | (2012.01) | |
| *C09D 175/04* | (2006.01) | |
| *C08G 18/48* | (2006.01) | |
| *C08G 18/67* | (2006.01) | |
| *C08G 18/76* | (2006.01) | |
| *C08G 18/79* | (2006.01) | |
| *C08G 18/24* | (2006.01) | |
| *B29K 75/00* | (2006.01) | |
| *B29K 105/24* | (2006.01) | |
| *B29L 7/00* | (2006.01) | |

(52) U.S. Cl.
CPC ............ *C09D 175/16* (2013.01); *B24B 37/24* (2013.01); *B29C 35/0805* (2013.01); *B29C 41/003* (2013.01); *B29C 41/02* (2013.01); *C08F 290/067* (2013.01); *C08G 18/244* (2013.01); *C08G 18/246* (2013.01); *C08G 18/4866* (2013.01); *C08G 18/6725* (2013.01); *C08G 18/73* (2013.01); *C08G 18/755* (2013.01); *C08G 18/7621* (2013.01); *C08G 18/7671* (2013.01); *C08G 18/7837* (2013.01); *C08G 18/798* (2013.01); *C08J 5/18* (2013.01); *C08L 75/04* (2013.01); *C09D 5/20* (2013.01); *C09D 175/04* (2013.01); *B29C 2035/0833* (2013.01); *B29K 2075/00* (2013.01); *B29K 2105/24* (2013.01); *B29K 2995/0046* (2013.01); *B29K 2995/0077* (2013.01); *B29L 2007/008* (2013.01); *C08J 2300/26* (2013.01); *C08J 2333/08* (2013.01)

(58) Field of Classification Search
None
See application file for complete search history.

(56) References Cited

U.S. PATENT DOCUMENTS

| | | | |
|---|---|---|---|
| 3,124,605 A | 3/1964 | Wagner et al. | |
| 3,183,112 A | 5/1965 | Gemassmer | |
| 3,919,218 A | 11/1975 | Schmitt et al. | |
| 4,188,472 A * | 2/1980 | Chang ................ | C08G 18/4269 522/90 |

(Continued)

FOREIGN PATENT DOCUMENTS

| | | |
|---|---|---|
| EP | 0 798 299 | 10/1997 |
| WO | 2012/100024 | 7/2012 |

OTHER PUBLICATIONS

Dvorchak et al., WO 2011/146123 (Translation) (Year: 2011).*
International Search Report dated Jul. 23, 2014 in International (PCT) Application No. PCT/EP2014/054591.

*Primary Examiner* — Jacob T Minskey
*Assistant Examiner* — Baileigh Kate Darnell
(74) *Attorney, Agent, or Firm* — Wenderoth, Lind & Ponack, L.L.P.

(57) ABSTRACT

Methods of producing an elastomer are disclosed that include (I) applying an actinic radiation curable composition preferably selected from a urethane (meth)acrylate, an allophanate urethane (meth)acrylate or a lactone-containing (meth)acrylate to a substrate at a thickness of at least 0.25 mm (10 mils); (II) exposing the composition ultraviolet radiation to produce a cured film; and (III) removing the film from the substrate. Related compositions are also disclosed.

11 Claims, No Drawings

(56) References Cited

U.S. PATENT DOCUMENTS

| | | | |
|---|---|---|---|
| 4,324,879 A | 4/1982 | Bock et al. | |
| 4,683,287 A * | 7/1987 | Koleske | C08F 220/28 528/354 |
| 5,135,964 A | 8/1992 | Lee et al. | |
| 5,739,251 A | 4/1998 | Venham et al. | |
| 5,767,220 A | 6/1998 | Venham et al. | |
| 5,777,024 A * | 7/1998 | Killilea | C08G 18/671 427/372.2 |
| 5,914,383 A | 6/1999 | Richter et al. | |
| 5,951,911 A | 9/1999 | Venham et al. | |
| 5,965,460 A | 10/1999 | Rach et al. | |
| 6,465,539 B1 * | 10/2002 | Weikard | C08G 18/10 428/423.1 |
| 6,753,394 B2 * | 6/2004 | Weikard | C08F 290/067 428/423.1 |
| 7,268,172 B2 * | 9/2007 | Bach | C08G 18/672 427/508 |
| 7,294,656 B2 | 11/2007 | Bach et al. | |
| 2006/0128923 A1 * | 6/2006 | Roesler | C08G 18/672 528/44 |
| 2006/0293484 A1 * | 12/2006 | Kinney | C08G 18/6725 528/44 |
| 2007/0232751 A1 * | 10/2007 | Ludewig | C08G 18/6633 524/589 |
| 2013/0011590 A1 * | 1/2013 | Subramanian | C08G 18/6692 428/34.7 |
| 2014/0037874 A1 * | 2/2014 | Subramanian | C03C 17/005 428/34.7 |

* cited by examiner

METHODS FOR MAKING ELASTOMERS, ELASTOMER COMPOSITIONS AND RELATED ELASTOMERS

FIELD OF THE INVENTION

The present invention relates to methods for making elastomers and compositions suitable for use in making elastomers.

BACKGROUND

Polyurethane elastomers have long been used in coating, adhesive and sealant compositions, and more recently have found utility in specialty applications such as chemical mechanical polishing (CMP) pads.

U.S. Pat. No. 5,965,460, for example, discloses CMP pads produced utilizing UV curable polyurethane materials. However, the pads disclosed suffer from several practical deficiencies. First, the uncured compositions have very high viscosities, between 10,000 cps and 200,000 cps at room temperature, which can lead to difficulties in handling and processing. Second, the Examples illustrate the materials suffer from oxygen inhibition during UV curing, which leads to uncured material on the outer surface of the pads. To mitigate against oxygen inhibition, the pads must either be cured in an inert atmosphere or a cover is placed over the uncured material, to prevent oxygen from reaching the surface of the material. In the event such techniques are not used, uncured material must be removed by conventional techniques, such as a solvent wipe, prior to use of the cured elastomer.

Improved methods for making UV-cured high thickness elastomers are, therefore, desirable.

SUMMARY OF THE INVENTION

The present invention relates to methods of making an elastomer. The methods comprise: (I) applying an actinic radiation curable composition to a substrate at a thickness of at least 10 mils; (II) exposing the composition to actinic radiation to produce a cured elastomeric film; and (III) removing the elastomeric film from the substrate. The high thickness elastomers obtained by this method are characterized in that they are substantially free from uncured surface residue even if no oxygen inhibition mitigation technique is used in the method. These methods have the advantage that no oxygen inhibition mitigation techniques are needed to prevent that materials suffer from oxygen.

In these methods, the composition preferably comprises: (a) at least one of: (1) a urethane (meth)acrylate polymer which is a reaction product of a composition comprising: (i) an organic polyisocyanate, (ii) a polyol having a number average molecular weight of from 600 to 4000 g/mol; and (iii) at least one of: (A) a hydroxyl-functional (meth)acrylate, and (B) an unsaturated (meth)acrylate polyol based on a polyester, polyether, polythioether, polyacetal, polycarbonate, dimer fatty alcohol and/or an esteramide and having a number average molecular weight of 400 to 8000 g/mol, at an isocyanate to hydroxyl equivalent ratio of from 0:5:1 to 1:0.5; (2) an allophonate urethane (meth)acrylate polymer; and (3) lactone-containing (meth)acrylate polymer; and (b) a photoinitiator.

In a preferred embodiment said composition comprises a reaction product of a composition comprising (a)(1)(i), (a)(1)(ii), and (a)(1)(iii)(B). Preferably said polyol comprises a triol. More preferably said triol comprises a polyester polyol. Most preferably said polyester polyol is prepared from components comprising:
(a) 54 to 58 mol % of a polyol component; and
(b) 46 to 42 mol % of a dicarboxylic acid component, wherein
  (1) the polyol component comprises:
    (i) 70 to 90 mol % of hexane-1,6-diol and
    (ii) 10 to 30 mol % of at least one higher valent alcohol selected from trimethylolpropane, glycerol, pentaerythritol and a mixture thereof, and
  (2) the dicarboxylic acid component comprises:
    (i) 50 to 80 mol % of isophthalic acid,
    (ii) 20 to 30 mol % of at least one dicarboxylic acid of the formula $HOOC-(CH_2)_n-COOH$, wherein n is an integer from 2-8 and
    (iii) 0 to 20 mol % of at least one dicarboxylic acid or at least one dicarboxylic acid anhydride selected from terephthalic acid, phthalic acid, phthalic acid anhydride, tetrahydrophthalic acid, tetrahydrophthalic acid anhydride, hexahydrophthalic acid and hexahydrophthalic acid anhydride.

In another preferred embodiment said composition comprises:
(a) up to 70 percent by weight of (a)(1), and
(b) at least 30 percent by weight of at least one of (a)(2) and (a)(3), wherein the weight percents are based on the total weight of (a)(1), (a)(2) and (a)(3) in the composition.

Preferably said reaction product further comprises further comprising (a)(2). More preferably (a)(2) is present in the composition in an amount of at least 20 percent by weight, based on the total weight of the composition.

In another preferred embodiment, said composition comprises:
(a) up to 70 percent by weight of (a)(1), and
(b) at least 30 percent by weight of at least one of (a)(2) and (a)(3),
wherein the weight percents are based on the total weight of (a)(1), (a)(2) and (a)(3) in the composition.

In another preferred embodiment, said composition is substantially 100% solids.

In some other respects, the present invention is directed to methods of making an elastomer comprising: (I) applying a composition to a substrate at a thickness of at least 10 mils; (II) exposing the composition to actinic radiation to produce a cured elastomeric film; and (III) removing the elastomeric film from the substrate, wherein the composition comprises: (a) a lactone-containing urethane (meth)acrylate; and (b) a photoinitiator.

In a preferred embodiment of said lactone-containing urethane (meth)acrylate polymer comprises a reaction product of a composition comprising: (i) one or more di- and/or polyisocyanates and (ii) one or more hydroxy functional lactone ester (meth)acrylates having a number average molecular weight of from 200 to 2000 g/mol and having the formula:

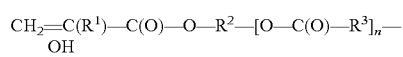

wherein n is an integer of from 1 to 5, $R^1$ is hydrogen or methyl, $R^2$ is an alkylene group or substituted alkylene group having from 2 to 10 carbon atoms and which may be substituted with one or more alkyl groups having from 1 to 12 carbon atoms, and $R^3$ represents a straight or branched chain alkylene group of from 3 to 8 carbon atoms, and which may be substituted with one or more alkyl groups having from 1 to 12 carbon atoms.

Preferably said one or more di- and/or polyisocyanates comprises a polyisocyanate comprising allophanate groups. More preferably said polyisocyanate comprising allophonate groups comprises a reaction product of a diisocyanate with a polyol having a number average molecular weight of from 600 to 4000 g/mol.

In another preferred embodiment, said composition is substantially 100% solids.

In other respects, the present invention relates to methods of making an elastomer, in which the methods comprise: (I) applying a composition to a substrate at a thickness of at least 10 mils; (II) exposing the composition to actinic radiation to produce a cured elastomeric film; and (III) removing the elastomeric film from the substrate. In these methods, the composition comprises: (a) a tri- or higher functional urethane (meth)acrylate which is a reaction product of a composition comprising: (i) one or more organic polyisocyanates, (ii) a polyol having a number average molecular weight of from 600 to 4000 g/mol, and (iii) at least one of: (1) a hydroxyl functional (meth)acrylate, and (2) an unsaturated (meth)acrylate polyol based on a polyester, polyether, polythioether, polyacetal, polycarbonate, dimer fatty alcohol and/or an esteramide and having a number average molecular weight of 400 to 8000 g/mol, at an isocyanate to hydroxyl equivalent ratio of from 0.5:1 to 1:0.5; and (b) a photoinitiator. In a preferred embodiment said thickness is at least 50 mils. In another preferred embodiment, said polyol comprises a triol and comprises a polyester polyol. More preferably said polyester polyol is prepared from components comprising:
  (a) 54 to 58 mol % of a polyol component; and
  (b) 46 to 42 mol % of a dicarboxylic acid component, wherein
    (1) the polyol component comprises:
      (i) 70 to 90 mol % of hexane-1,6-diol and
      (ii) 10 to 30 mol % of at least one higher valent alcohol selected from trimethylolpropane, glycerol, pentaerythritol and a mixture thereof, and
    (2) the dicarboxylic acid component comprises:
      (i) 50 to 80 mol % of isophthalic acid,
      (ii) 20 to 30 mol % of at least one dicarboxylic acid of the formula HOOC—$(CH_2)_n$—COOH, wherein n is an integer from 2-8 and
      (iii) 0 to 20 mol % of at least one dicarboxylic acid or at least one dicarboxylic acid anhydride selected from terephthalic acid, phthalic acid, phthalic acid anhydride, tetrahydrophthalic acid, tetrahydrophthalic acid anhydride, hexahydrophthalic acid and hexahydrophthalic acid anhydride.

Preferably said composition further comprises an allophonate urethane (meth)acrylate polymer, lactone-containing (meth)acrylate polymer, or a combination thereof. In another preferred embodiment said composition is substantially 100% solids.

In still other respects, the present invention is directed to methods of making an elastomer, comprising: (I) applying a composition to a substrate at a thickness of at least 10 mils; (II) exposing the composition to actinic radiation to produce a cured elastomeric film; and (III) removing the elastomeric film from the substrate. In these methods, the composition comprises: (a) a urethane (meth)acrylate which is a reaction product of a composition comprising: (i) an organic polyisocyanate, (ii) a polyol having a number average molecular weight of from 600 to 4000 g/mol, and (iii) at least one of: (1) a hydroxyl functional (meth)acrylate, and (2) an unsaturated (meth)acrylate polyol based on a polyester, polyether, polythioether, polyacetal, polycarbonate, dimer fatty alcohol and/or an esteramide and having a number average molecular weight of 400 to 8000 g/mol, at an isocyanate to hydroxyl equivalent ratio of from 0.5:1 to 1:0.5; (b) at least one of: (i) an allophanate unsaturated urethane (meth)acrylate, different from (a); and (ii) a lactone-containing (meth)acrylate, different from (a) and (b)(i); and (c) a photoinitiator.

The present invention is also directed to compositions comprising: (a) up to 70 percent by weight, based on the total weight of (a) and (b), of an unsaturated (meth)acrylate polymer or oligomer which is the reaction product of a composition comprising: (i) an organic polyisocyanate, (ii) a polyol having a number average molecular weight of from 600 to 4000 g/mol, and (iii) at least one of: (1) a hydroxyl-functional (meth)acrylate, (2) an unsaturated (meth)acrylate polyol based on a polyester, a polyether, a polythioether, a polyacetal, a polycarbonate, a dimer fatty alcohol and/or an esteramide, in each case with a number average molecular weight of 400 to 8000 g/mol, at an isocyanate to hydroxyl equivalent ratio of from 0.5:1 to 1:0.5; (b) at least 30 percent by weight, based on the total weight of the sum of (a) and (b), of at least one of: (i) an allophanate unsaturated urethane (meth)acrylate, different from component (a); and (ii) a lactone-containing (meth)acrylate different from (a) and (b)(i); and (c) a photoinitiator. In a preferred embodiment of said composition, said polymeric polyol comprises a triol. Preferably said triol comprises a polyester polyol. In another preferred embodiment said composition is substantially 100% solids.

The present invention also relates to, among other things, cured elastomers produced according to such processes and compositions.

DETAILED DESCRIPTION OF THE INVENTION

Various embodiments are described and illustrated in this specification to provide an overall understanding of the structure, function, operation, manufacture, and use of the disclosed products and processes. It is understood that the various embodiments described and illustrated in this specification are non-limiting and non-exhaustive. Thus, the invention is not limited by the description of the various non-limiting and non-exhaustive embodiments disclosed in this specification. Rather, the invention is defined solely by the claims. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference herein.

Reference throughout this specification to "certain embodiments, "some embodiments, "various non-limiting embodiments," or the like, means that a particular feature or characteristic may be included in an embodiment. Thus, use of such phrases and similar phrases, in this specification does not necessarily refer to a common embodiment, and may refer to different embodiments. Further, the particular features or characteristics may be combined in any suitable manner in one or more embodiments. Thus, the particular features or characteristics illustrated or described in connection with various embodiments may be combined, in whole or in part, with the features or characteristics of one or more other embodiments without limitation. Such modifications and variations are intended to be included within the scope of the present specification. In this manner, the various embodiments described in this specification are non-limiting and non-exhaustive.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges subsumed within the recited range. For example, a range of "1 to 10" is intended to include all sub-ranges between (and including) the recited minimum value of 1 and the recited maximum value of 10, that is, having a minimum value equal to or greater than 1 and a maximum value equal to or less than 10. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification.

The grammatical articles "one", "a", "an", and "the", as used herein, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As used herein, "(meth)acrylate" encompasses acrylates and methacrylates. As used herein, "polymer" encompasses prepolymers, oligomers and both homopolymers and copolymers; the prefix "poly" refers to two or more.

As indicated earlier, the present invention is, in some embodiments, directed to methods of making an elastomer. These methods comprise: (1) applying a composition to a substrate at a thickness of at least 10 mils, such as at least 20 mils, at least 30 mils, at least 40 mils, at least 50 mils, at least 60 mils, or in some cases, at least 70 mils and/or, in some cases, no more than 100 mils; (2) exposing the composition actinic radiation, such as ultraviolet ("UV") radiation having, for example, V and H bulbs that emit in the UV A (315-380 nm), UV B (280-315 nm) and UV C (100-280 nm) to produce a cured elastomeric film; and (3) removing the elastomeric film from the substrate, such as by pulling, cutting, and/or peeling. In some embodiments, no oxygen inhibition mitigation techniques are used, such as the use of an inert atmosphere or a cover sheet.

In certain embodiments, the composition used in the present invention comprises a urethane (meth)acrylate polymer that is a reaction product of a composition comprising: (i) an organic polyisocyanate, (ii) a polyol having a number average molecular weight of from 600 to 4000 g/mol, and at least one of (iii) (1) a hydroxyl-functional (meth)acrylate, and (2) an unsaturated (meth)acrylate polyol based on a polyester, polyether, polythioether, polyacetal, polycarbonate, dimer fatty alcohol and/or an esteramide and having a number average molecular weight of 400 to 8000 g/mol, such as an unsaturated (meth)acrylate polyol that is polyether, polyester and/or polycarbonate based and has an OH number of from 30 to 500, such as 100 to 400 or 100 to 300. In some cases, the unsaturated (meth)acrylate polyol is prepared by reacting a polyether or polyester or polycarbonate di- or polyol with (meth)acrylic at an isocyanate to hydroxyl equivalent ratio of from 0.5:1 to 1:0.5, such as 0.9:1 to 1:0.9, such as 1:1.

In some embodiments of the present invention, the foregoing urethane (meth)acrylate polymer is a reaction product of a composition comprising: (i) an organic polyisocyanate; (ii) a polyol having a number average molecular weight of from 600 to 4000 g/mol; and (iii) at least one of: (1) a hydroxyl-functional (meth)acrylate, such as a mono-, di-, tri- or poly-hydroxyl-$C_1$-$C_{10}$-alkyl or $C_6$-$C_{10}$-aryl (meth)acrylate, and (2) an unsaturated (meth)acrylate polyol based on a polyester, a polyether, a polythioether, a polyacetal, a polycarbonate, a dimer fatty alcohol and/or an esteramide, in each case with a number average molecular weight of 400 to 8000 g/mol, wherein (1) is present in an amount of 0 to 100% by weight, such as 10 to 90% by weight, and/or (2) is present in an amount of 0 to 100%, such as 10 to 90% by weight, wherein these weight percents are based on the total weight of components (1) and (2) and, in some cases, total 100%. In some embodiments, the composition used to prepare the foregoing urethane (meth)acrylate has an isocyanate to hydroxyl equivalent ratio of from 0.5:1 to 1:0.5, such as 0.9:1 to 1:0.9, such as 1:1.

Suitable organic polyisocyanates for use as component (i) in preparing the urethane (meth)acrylate polymer include those having aliphatically, cycloaliphatically and/or aromatically bound isocyanate groups, such as those with a molecular weight of from 144 to 1000 g/mol, such as from 168 to 300 g/mol. Suitable examples include butylene diisocyanate, hexamethylene diisocyanate (HDI), isophorone diisocyanate (IPDI), 3(4)-isocyanatomethyl-methylcyclohexyl isocyanate (IMCI), trimethylhexamethylene diisocyanate (2,2,4 and/or 2,4,4-trimethyl-hexamethylene diisocyanate), the isomeric bis(4,4'-isocyanato-cyclohexyl)methanes ($H_{12}MDI$), the isomeric bis(isocyanatomethyl)-methylcyclohexanes, isocyanatomethyl-1,8-octane diisocyanate, 1,4-cyclohexylene diisocyanate, 1,4-phenylene diisocyanate, 2,4- and/or 2,6-toluylene diisocyanate (TDI), 1,5-naphthylene diisocyanate, 2,4'- and/or 4,4'-diphenylmethane diisocyanate (MDI), triphenylmethane-4,4',4"-triisocyanate or their derivatives having a urethane, isocyanurate, allophanate, biuret, uretdione, iminooxadiazinedione structure and/or mixtures thereof as well as mixtures of aliphatic and aromatic diisocyanates and/or polyisocyanates. The production of such derivatives is known and described, for example, in U.S. Pat. Nos. 3,124,605, 3,183,112, 3,919,218, and 4,324,879 and in EP 798 299.

In some cases, HDI, IPDI, TDI, $H_{12}MDI$ and/or isocyanurate group-containing polyisocyanates obtained by trimerization of HDI, TDI or IPDI are used.

In certain embodiments, the polyol used as component (ii) in preparing the urethane (meth)acrylate polymer has a number average molecular weight of from 600 to 4000 g/mol, such as 800 to 3000 g/mol, or some cases, 1000 to 2000 g/mol. Exemplary suitable polyols include, for example, polymeric polyols, such as diols, triols, and higher functionality polyols, including, but not limited to, polyether polyols, polyester polyols, and/or polycarbonate polyols, among others.

Suitable polyether polyols include, for example, alkylene glycols, such as polyethylene glycol, polypropylene glycol, and/or polytetramethylene ether glycol, and include those prepared by reacting a suitable alcohol (such as ethylene glycol, propylene glycol, butanol, glycerol, trimethylol propane, hexane diol, pentaerythritol and the like) with an alkylene oxide, such as ethylene oxide and/or propylene oxide.

Suitable polyester polyols include those prepared by polycondensation of an alcohol, such as, for example, ethylene glycol, propylene glycol, butanol, glycerol, trimethylol propane, hexane diol, and/or pentaerythritol with a diacid and/or anhydride, such as adipic, fumaric, maleic, terephthalic, isophthalic, phtalic acids and the like, anhydrides thereof, and/or a mixture thereof. In certain embodiments, the polyester polyol is prepared from components comprising (a) 54 to 58 mol % of a polyol component and (b) 46 to 42 mol % of a dicarboxylic acid component, wherein (1) the polyol component comprises (i) 70 to 90 mol % of hexane-1,6-diol and (ii) 10 to 30 mol % of at least one higher valent alcohol selected from trimethylolpropane, glycerol, pentaerythritol and mixtures of these polyols, and (2) the dicarboxylic acid component comprises (i) 50 to 80 mol % of isophthalic acid, (ii) 20 to 30 mol % of at least one dicarboxylic acid of the formula $HOOC-(CH_2)_n-COOH$ (n=an integer from 2-8) and (v) 0 to 20 mol % of at least one dicarboxylic acid or at least one dicarboxylic acid anhydride selected from terephthalic acid, phthalic acid, phthalic acid anhydride, tetrahydrophthalic acid, tetrahydrophthalic acid anhydride, hexahydrophthalic acid and hexahydrophthalic acid anhydride, as are described in U.S. Pat. No. 4,656,243 at col. 3, ln. 15 to col. 4, ln. 25, the cited portion of which being incorporated herein by reference.

Suitable polycarbonate polyols include, for example, polycondensation reaction products of polyhydric alcohols and phosgene or polycondensation reaction products of polyhydric alcohols and diesters of carbonic acid, wherein suitable polyhydric alcohols include, for example, diols such as 1,3-propanediol; ethylene glycol; propylene glycol; 1,4-propanediol; diethylene glycol; triethylene glycol; tetraethylene glycol; 1,4-butanediol; 1,6-hexanediol; trimethylene-pentanediol; 1,4-cyclohexanediol; 1,4-cyclohexanedimethanol; neopentyl glycol; 1,8-octanediol; and combinations of any thereof, as well as tri-functional and multi-functional hydroxyl compounds such as glycerol; trimethylolpropane; trimethylolethane; hexanetriol isomers; pentaerythritol; and combinations of any thereof.

In certain embodiments, the polymeric polyol has an average hydroxyl functionality of 1 to 5, such as 2 to 4, 2.5 to 3.5. In certain embodiments, the polymeric polyol has an OH number of 25 to 350 mg KOH/g solids, such as 80 to 250 mg KOH/g solids, or, in some cases, 100 to 200 mg KOH/g solids.

Hydroxy-functional (meth)acrylates suitable for use as component (iii)(1) in preparing the urethane (meth)acrylate polymer include, for example, mono-, di-, tri-, or polyhydroxyl $C_1$ to $C_{10}$-alkyl or $C_6$ to $C_{10}$-aryl (meth)acrylates, which can be prepared by reacting relatively low molecular weight diols, triols and polyols (such as ethylene glycol, propylene glycol, butanol, glycerol, trimethylol propane, hexane diol, pentaerythritol and the like) with acrylic and/or methacrylic acid in amounts such that the resultant product contains one or more hydroxyl groups. Specific examples of suitable mono-, di-, tri-, or polyhydroxyl $C_1$ to $C_{10}$-alkyl or $C_6$ to $C_{10}$-aryl (meth)acrylates include, but are not limited to, hydroxyethyl (meth)acrylate, hydroxypropyl (meth)acrylate, hydroxybutyl (meth)acrylate, hydroxypropyl (meth)acrylate, hydroxyhexyl (meth)acrylate, triglycerol di(meth)acrylate, and/or dipentaerythritol penta(meth)acrylate.

Unsaturated polyether (meth)acrylates suitable for use as component (iii)(2) in preparing the foregoing urethane (meth)acrylate polymer can be prepared by reacting a polyether polyol (having an hydroxyl functionality of, for example, from 2 to 6) with a (meth)acrylic acid. Suitable polyether polyols are often prepared by reacting a suitable polyol such as, e.g., ethylene glycol, propylene glycol, butanol, glycerol, trimethylol propane, hexane diol, and pentaerythritol, and the like, with ethylene oxide, propylene oxide or a mixture thereof. In certain embodiments, when the unsaturated polyether (meth)acrylate is to be used to prepare the unsaturated urethane (meth)acrylate, the polyether is selected so as to produce the (meth)acrylate having the desired OH number and the components are reacted in amounts such that the resultant unsaturated polyether (meth)acrylate has an OH number of from 30 to 500, such as from 100 to 400, or, in some cases, from 100 to 300.

Unsaturated polyester (meth)acrylates suitable for use as component (iii)(2) in preparing the foregoing urethane (meth)acrylate polymer can be prepared by reacting a polyester polyol (having an hydroxyl functionality of from 2 to 6) with acrylic and/or methacrylic acid. Suitable polyester polyols are generally prepared by reacting a suitable starting glycol such as, e.g., ethylene glycol, propylene glycol, butanol, glycerol, trimethylol propane, hexane diol, pentaerythritol or a mixture thereof with diacids or anhydrides, such as adipic, fumaric, maleic, terephthalic, isophthalic, phtalic and the like, or a mixture thereof. In certain embodiments, when the unsaturated polyester (meth)acrylate is to be used to prepare the unsaturated urethane (meth)acrylate, the polyester is selected so as to produce the (meth)acrylate having the desired OH number and the components are reacted in amounts such that the resultant unsaturated polyester (meth)acrylate has an OH number of from 30 to 500, such as from 100 to 400 or, in some cases, from 100 to 300.

In certain embodiments, the foregoing urethane (meth) acrylate polymer is present in the composition in an amount of up to 90 percent by weight, up to 80 percent by weight, or, in some cases, up to 70 percent by weight, and/or at least 10 percent by weight, at least 20 percent by weight, or, in some cases, at least 30 percent by weight, the foregoing weight percents being based on the total weight of the composition.

In some embodiments, in addition to or in lieu of the previously described urethane (meth)acrylate polymer, the composition comprises an allophonate urethane (meth)acrylate that is different from the urethane (meth)acrylate described above. Allophanate urethane acrylates can be prepared, for example, by reacting urethane groups of a urethane (meth)acrylate with a isocyanate groups of an isocyanate-functional component, such as a polyisocyanate or, alternatively, by reacting the urethane groups of a polyurethane with isocyanate groups of an isocyanate-functional (meth)acrylate. Suitable allophanate urethane acrylates, methods of their preparation, and components thereof are described in U.S. Patent Application Publication Nos. 2006/0052527, 2006/0079660, 2007/0191570, 2006/0205911, 2006/0128923 and 2007/0232751, and U.S. Pat. Nos. 5,951,911, 5,767,220 and 5,739,251, the entire contents of each of which are incorporated herein by reference.

In some embodiments, the allophanate unsaturated urethane (meth)acrylate polymer has a residual monomer content of less than 0.5% by weight and an NCO content of less than 1% by weight, and is prepared by reacting a composition comprising: (A) a compound containing isocyanate groups, (B) a hydroxy-functional compound which contains groups which react, with polymerization, with ethylenically unsaturated compounds on exposure to actinic radiation (radiation-curing groups) and (C) optionally further compounds containing NCO-reactive groups, (D) optionally in the presence of a catalyst used to form NCO-group-containing urethanes having radiation-curing groups, which are subsequently reacted, without further addition of compounds containing isocyanate groups, in the presence (E) of an allophanatization catalyst, the ratio of NCO groups of the compounds from (A) to the OH groups of the compounds from (B) and, where used, (C) being 1.45:1.0 to 1.1:1.0, such as 1.43:1.0 to 1.2:1.0, or, in some cases, 1.35:1.0 to 1.3:1.0. As used herein, "actinic radiation" refers to electromagnetic, ionizing radiation, especially electron beams, UV radiation and also visible light (Roche Lexikon Medizin, 4th edition; Urban & Fischer Verlag, Munich 1999). Groups which react, with polymerization, with ethylenically unsaturated compounds on exposure to actinic radiation (radiation-curing groups) are for the purposes of the present invention vinyl ether, maleyl, fumaryl, maleimide, dicyclopentadienyl, acrylamide, acrylate and/or methacrylate groups.

Suitable isocyanate-containing compounds (A) for use in preparing the allophonate unsaturated urethane (meth)acrylate polymer include aromatic, aliphatic and cycloaliphatic polyisocyanates, such as compounds of the formula Q(NCO)$_n$ having a molecular weight below 800 g/mole, in which n is a number from 2 to 4 and Q is an aromatic $C_6$-$C_{15}$ hydrocarbon radical, an aliphatic $C_4$-$C_{12}$ hydrocarbon radical or a cycloaliphatic $C_6$-$C_{15}$ hydrocarbon radical. Specific examples include, but are not limited to, diisocyanates, such as TDI, MDI, triisocyanatononane (TIN), naphthyl diisocyanate (NDI), 4,4'-diisocyanatodicyclohexylmethane, 3-isocyanatomethyl-3,3,5-trimethylcyclohexyl isocyanate, IPDI, tetramethylene diisocyanate, (HDI), 2-methylpentamethylene diisocyanate, 2,2,4-trimethylhexamethylene diisocyanate (THDI), dodecamethylene diisocyanate, 1,4-diisocyanatocyclohexane, 4,4'-diisocyanato-3,3'-dimethyldicyclohexylmethane, 2,2-bis(4-isocyanatocyclohexyl)propane, 3-isocyanatomethyl-1-methyl-1-isocyanato-cyclohexane (MCI), 1,3-diisooctylcyanato-4-methylcyclohexane, 1,3-diisocyanato-2-methylcyclohexane, α,α,α',α'-tetramethyl-m- or -p-xylylene diisocyanate (TMXDI), or a mixture thereof.

Likewise suitable as isocyanate-containing compounds (A) for use in preparing the allophonate unsaturated urethane (meth)acrylate are reaction products of the aforementioned isocyanates with themselves or with one another to form uretdiones or isocyanurates. Mention may be made by way of example of Desmodur® N3300, Desmodur® N3400 or Desmodur® N3600 (all Bayer MaterialScience, Leverkusen, Del.).

Also suitable as isocyanate-containing compounds (A) for use in preparing the allophonate unsaturated urethane (meth) acrylate are reaction products of the aforementioned isocyanates with other isocyanate-reactive compounds to form prepolymers. Such isocyanate-reactive compounds include, for example, polyols, such as polyether polyols, polyester polyols, polycarbonate polyols and polyhydric alcohols. As polyols it is possible to use hydroxyl compounds of relatively high molecular weight and, in minor amounts, hydroxyl compounds of low molecular weight as well.

Examples of suitable hydroxyl-containing compounds of component (B) for use in preparing the allophonate unsaturated urethane (meth)acrylate are 2-hydroxyethyl(meth) acrylate, polyethylene oxide mono(meth)acrylate (e.g. PEA6/PEM6; Laporte Performance Chemicals Ltd., UK), polypropylene oxide mono(meth)acrylate (e.g. PPA6, PPM5S; Laporte Performance Chemicals Ltd., UK), polyalkylene oxide mono(meth)acrylate (e.g. PEM63P, Laporte Performance Chemicals Ltd., UK), poly(ε-caprolactone) mono(meth)acrylates such as, Tone M100® for example, (Dow, Schwalbach, Del.), 2-hydroxypropyl(meth)acrylate, 4-hydroxybutyl(meth)acrylate, hydroxybutyl vinyl ether, 3-hydroxy-2,2-dimethylpropyl(meth)acrylate, the hydroxy-functional mono-, di- or where possible higher acrylates such as, for example, glyceryl di(meth)acrylate, trimethylolpropane di(meth)acrylate, pentaerythritol tri(meth)acrylate or dipentaerythritol penta(meth)acrylate, which are obtainable by reacting polyhydric, optionally alkoxylated alcohols such as trimethylolpropane, glycerol, pentaerythritol, dipentaerythritol.

Likewise suitable as a constituent of (B) for use in preparing the allophonate unsaturated urethane (meth)acrylate are alcohols obtained from the reaction of acids containing double bonds with epoxide compounds optionally containing double bonds, such as, for example, the reaction products of (meth)acrylic acid with glycidyl(meth)acrylate or bisphenol A diglycidyl ether.

Additionally it is likewise possible to use unsaturated alcohols which are obtained from the reaction of optionally unsaturated acid anhydrides with hydroxy compounds and epoxide compounds that optionally contain acrylate groups. By way of example these are the reaction products of maleic anhydride with 2-hydroxyethyl(meth)acrylate and glycidyl (meth)acrylate. In some embodiments, (B) comprises a compound having an OH functionality of from 0.9 to 1.1. In some embodiments, (B) comprises hydroxyethyl(meth)acrylate, hydroxypropyl(meth)acrylate and/or hydroxybutyl (meth)acrylate.

It is possible to use further compounds (C), which are different from those of (B), and contain NCO-reactive groups such as OH, SH or NH groups, for example. These may be, for example, NH- or SH-functional compounds containing groups which react, with polymerization, with ethylenically unsaturated compounds on exposure to actinic radiation.

Compounds which are non-reactive under exposure to actinic rays, such as polyether polyols, polyester polyols, polycarbonate polyols and polyhydric alcohols, for example, can also be used in addition to influence the product properties, as component (C). As polyols it is possible to use hydroxyl compounds of relatively high molecular weight and, in minor amount, hydroxyl compounds of low molecular weight as well.

Hydroxyl compounds of relatively high molecular weight include the hydroxy polyesters, hydroxy polyethers, hydroxy polythioethers, hydroxy polyacetals, hydroxy polycarbonates, dimer fatty alcohols and/or esteramides, in each case with number average molecular weights of 400 to 8000 g/mole, such as 500 to 6500 g/mole.

Low molecular weight polyols that can be used are, for example, polyols with a molecular weight of 62 to 399 g/mole, such as ethylene glycol, triethylene glycol, tetraethylene glycol, propane-1,2-diol and -1,3-diol, butane-1,4-diol and -1,3-diol, hexane-1,6-diol, octane-1,8-diol, neopentyl glycol, 1,4-bis(hydroxymethyl)cyclohexane, bis(hydroxymethyl)tricyclo[5.2.1.0$^{2,6}$]decane, 1,4-bis(2-hydroxyethoxy)-benzene, 2-methyl-1,3-propanediol, 2,2,4-trimethylpentanediol, 2-ethyl-1,3-hexanediol, dipropylene glycol, polypropylene glycols, dibutylene glycol, polybutylene glycols, bisphenol A, tetrabromobisphenol A, glycerol, trimethylolpropane, hexane-1,2,6-triol-butane-1,2,4-triol, pentaerythritol, quinitol, mannitol, sorbitol, methyl glycoside and 4,3,6-dianhydrohexitols.

Suitable polyether polyols include, for example, addition compounds or mixed addition compounds, prepared using starter molecules with a valency of two to six such as water or the abovementioned polyols or amines containing 1 to 4-NH bonds, of tetrahydrofuran, styrene oxide, ethylene oxide, propylene oxide, the butylene oxides or epichlorohydrin, particularly those of ethylene oxide and/or of propylene oxide, such as propylene oxide polyethers which contain on average 2 to 4 hydroxyl groups and which can contain up to 50% by weight of incorporated polyethylene oxide units.

Examples of suitable polyester polyols include reaction products of polyhydric, such as dihydric and optionally additionally trihydric alcohols, with polybasic, such as dibasic, carboxylic acids. In lieu of the free carboxylic acid it is also possible to use the corresponding polycarboxylic anhydrides or corresponding polycarboxylic esters of lower alcohols or mixtures thereof for preparing the polyesters. The polycarboxylic acids may be aliphatic, cycloaliphatic aromatic and/or heterocyclic in nature and may where appropriate be substituted, by halogen atoms for example, and/or unsaturated. By way of example mention is made of adipic acid, phthalic acid, isophthalic acid, succinic acid, suberic acid, azelaic acid, sebacic acid, trimellitic acid, phthalic anhydride, tetrahydrophthalic anhydride, glutaric anhydride, tetrachlorophthalic anhydride, endomethylenetetrahydrophthalic anhydride, maleic anhydride, maleic acid, fumaric acid, dimeric and trimeric fatty acids such as oleic acid, optionally in a mixture with monomeric fatty acids, dimethyl terephthalate or bis-glycol terephthalate. In some embodiments, the hydroxy polyester melts at below 60° C. and has 2 or 3 terminal OH groups.

Suitable polycarbonate polyols are obtainable, for example, by reacting carbonic acid derivatives, e.g. diphenyl carbonate, dimethyl carbonate or phosgene, with diols. Examples of suitable such diols include ethylene glycol, triethylene glycol, tetraethylene glycol, propane-1,2-diol and -1,3-diol, butane-1,4-diol and -1,3-diol, pentane-1,5-diol, hexane-1,6-diol, octane-1,8-diol, neopentyl glycol, 1,4-bis(hydroxymethyl)cyclohexane, bis(hydroxymethyl)tricyclo[5.2.1.0$^{2,6}$]decane or 1,4-bis(2-hydroxyethoxy)-benzene, 2-methyl-1,3-propanediol, 2,2,4-trimethylpentanediol, dipropylene glycol, polypropylene glycols, dibutylene glycol, polybutylene glycols, bisphenol A and tetrabromobisphenol A, or mixtures of said diols. In some cases, the diol component receives 40% to 100% by weight of hexanediol, such as hexane-1,6-diol, and/or hexanediol derivatives, such as those which in addition to terminal OH groups contain ether groups or ester groups, examples being products obtained by reacting 1 mol of hexanediol with at least 1 mol, such as 1 to 2 mol, of caprolactone in accordance with DE-A 1 770 245, or by etherifying hexanediol with itself to give the di- or trihexylene glycol. The preparation of such derivatives is known for example from DE-A 1 570 540. The polyether-polycarbonate diols described in DE-A 3 717 060 can also be used.

In some embodiments, the hydroxypolycarbonates are substantially linear. Incorporation of polyfunctional components, such as polyols of low molecular weight, however, can provide branching. Examples of compounds suitable for this purpose include trimethylolpropane, hexane-1,2,6-triol, glycerol, butane-1,2,4-triol, pentaerythritol, quinitol, mannitol, sorbitol, methyl glycoside and 4,3,6-dianhydrohexitols.

Additionally it is possible to incorporate groups having a hydrophilicizing action, particularly if use from an aqueous medium is envisaged, such as in an aqueous coating material, for example. Groups with a hydrophilicizing action are ionic groups, which may be either cationic or anionic in nature, and/or nonionic hydrophilic groups. Cationically, anionically or nonionically dispersing compounds are those which contain, for example, sulphonium, ammonium, phosphonium, carboxylate, sulphonate or phosphonate groups or the groups which can be converted into the aforementioned groups by forming salts (potentially ionic groups) or which contain polyether groups and can be incorporated by means of existing isocyanate-reactive groups, such as hydroxyl and amino groups.

Examples of suitable compounds containing ionic or potentially ionic groups are mono- and dihydroxycarboxylic acids, mono- and diaminocarboxylic acids, mono- and dihydroxysulphonic acids, mono- and diaminosulphonic acids and also mono- and dihydroxyphosphonic acids or mono- and diaminophosphonic acids and their salts, such as dimethylol propionic acid, dimethylolbutyric acid, hydroxypivalic acid, N-(2-aminoethyl)-β-alanine, 2-(2-aminoethylamino)ethane-sulphonic acid, ethylenediamine-propyl- or butylsulphonic acid, 1,2- or 1,3-propylenediamine-β-ethylsulphonic acid, malic acid, citric acid, glycolic acid, lactic acid, glycine, alanine, taurine, lysine, 3,5-diaminobenzoic acid, an adduct of IPDI and acrylic acid (EP-A 0 916 647, Example 1) and its alkali metal and/or ammonium salts; the adduct of sodium bisulphite with but-2-ene-1,4-diol, polyethersulphonate, the propoxylated adduct of 2-butenediol and NaHSO$_3$, described for example in DE-A 2 446 440 (page 5-9, formula I-III) and also structural units which can be converted into cationic groups, such as N-methyldiethanolamine, as hydrophilic synthesis components. In some embodiments, the ionic or potential ionic compounds possess carboxyl or carboxylate and/or sulphonate groups and/ or ammonium groups, including, for example, ionic compounds containing carboxyl and/or sulphonate groups as ionic or potentially ionic groups, such as the salts of N-(2-aminoethyl)-β-alanine, of 2-(2-aminoethylamino)ethanesulphonic acid or of the adduct of IPDI and acrylic acid (EP-A-0 916 647, Example 1) and also of dimethylolpropionic acid.

Suitable nonionically hydrophilicizing compounds are, for example, polyoxyalkylene ethers containing at least one hydroxyl or amino group. These polyethers include a fraction of from 30% to 100% by weight of units derived from ethylene oxide. Suitable compounds include polyethers of linear construction with a functionality of between 1 and 3, but also compounds of the general formula (I):

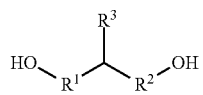

in which $R^1$ and $R^2$ independently of one another are each a divalent aliphatic, cycloaliphatic or aromatic radical having 1 to 18 carbon atoms, which may be interrupted by oxygen and/or nitrogen atoms, and $R^3$ is an alkoxy-terminated polyethylene oxide radical.

Nonionically hydrophilicizing compounds are, for example, also monohydric polyalkylene oxide polyether alcohols containing on average 5 to 70, such as 7 to 55, ethylene oxide units per molecule, such as are obtainable by alkoxylating suitable starter molecules (e.g. in Ullmanns Encyclopadie der technischen Chemie, 4th edition, volume 19, Verlag Chemie, Weinheim pp. 31-38), such as saturated monoalcohols such as methanol, ethanol, n-propanol, isopropanol, n-butanol, isobutanol, sec-butanol, the isomers pentanols, hexanols, octanols and nonanols, n-decanol, n-dodecanol, n-tetradecanol, n-hexadecanol, n-octadecanol, cyclohexanol, the isomeric methylcyclohexanols or hydroxylmethylcyclohexane, 3-ethyl-3-hydroxymethyloxetane or tetrahydrofurfuryl alcohol, diethylene glycol monoalkyl ethers such as, for example, diethylene glycol monobutyl ether, unsaturated alcohols such as allyl alcohol, 1,1-dimethylallyl alcohol or oleyl alcohol, aromatic alcohols such as phenol, the isomeric cresols or methoxyphenols, araliphatic alcohols such as benzyl alcohol, anisyl alcohol or cinnamyl alcohol, secondary monoamines such as dimethylamine, diethylamine, dipropylamine, diisopropylamine, dibutylamine, bis(2-ethylhexyl)amine, N-methyl- and N-ethylcyclohexylamine or dicyclohexylamine and also heterocyclic secondary amines such as morpholine, pyrrolidine, piperidine or 1H-pyrazole.

Alkylene oxides suitable for the alkoxylation reaction are, for example, ethylene oxide and propylene oxide, which can be used in any order or in a mixture.

The polyalkylene oxide polyether alcohols are either straight polyethylene oxide polyethers or mixed polyalkylene oxide polyethers at least 30 mol %, such as at least 40 mol %, of whose alkylene oxide units are composed of ethylene oxide units.

Suitable compounds of the catalyst component (D) include urethanization catalysts, such as organotin compounds or aminic catalysts. Suitable organotin compounds include dibutyltin diacetate, dibutyltin dilaurate, dibutyltin bis-acetoacetonate and tin carboxylates such as tin octoate, for example. The tin catalyst(s) may be used in combination with aminic catalysts, such as aminosilanes or 1,4-diazabicyclo[2.2.2]octane.

The catalyst (D), if used at all, is often employed in amounts of 0.001% to 5.0%, such as 0.001% to 0.1%, or, in some cases, 0.005%-to 0.05% by weight, based on solids content of the process product.

Suitable for use as (E) are allophanatization catalysts, such as zinc salts, including zinc octoate, zinc acetylacetonate and zinc 2-ethylcaproate, or tetraalkylammonium compounds, such as N,N,N-trimethyl-N-2-hydroxypropylammonium hydroxide, N, N, N-trimethyl-N-2-hydroxypropylammonium 2-ethylhexanoate or choline 2-ethylhexanoate.

The allophanatization catalyst is often used in amounts of 0.001-5.0% by weight, such as 0.01-1.0% by weight, or, in some cases, 0.05-0.5% by weight, based on solids content of the process product.

In principle it is possible to use the allophanatization catalyst (E) even for the urethanization reaction in (D) and to simplify the two-stage procedure into a one-stage reaction. The catalyst (E) can be added in a portion all at once or else in a number of portions or else continuously. In some embodiments, the catalyst (E) is added at a rate of 200-600 ppm/h and in order to complete the allophanatization the reaction mixture is stirred on until the desired NCO content of the end product is reached.

In certain embodiments, the allophanatization reaction is carried out until the NCO content of the product is below 0.5% by weight, such as below 0.3% by weight.

It is possible in principle to react a residual NCO group content with NCO-reactive compounds such as alcohols, for example, after the end of the allophanatization reaction. This can give products having low NCO contents.

It is also possible to apply the catalysts (D) and/or (E) to support materials by methods known to the skilled person and to use them as heterogeneous catalysts.

It is possible to make use at any desired point in the production of the allophonate unsaturated urethane (meth) acrylate of solvents or reactive diluents. Suitable solvents are inert towards the functional groups present in the process product from the time of their addition up to the end of the process and are, for example, hydrocarbons, ketones and esters, e.g. toluene, xylene, isooctane, acetone, butanone, methyl isobutyl ketone, ethyl acetate, butyl acetate, tetrahydrofuran, N-methyl-pyrrolidone, dimethylacetamide and dimethylformamide, though, in some cases, no solvent is added.

As reactive diluents it is possible to use compounds which in the course of UV curing are likewise (co)polymerized and hence incorporated into the polymer network and are inert towards NCO groups. Such reactive diluents are described exemplarily, by way of example, in P. K. T. Oldring (Ed.), Chemistry & Technology of UV & EB Formulations For Coatings, Inks & Paints, Vol. 2, 1991, SITA Technology, London, pp. 237-285. They may be esters of acrylic acid or methacrylic acid with mono- or polyfunctional alcohols. Examples of suitable alcohols include the isomeric butanols, pentanols, hexanols, heptanols, octanols, nonanols and decanols, and also cycloaliphatic alcohols such as isobornol, cyclohexanol and alkylated cyclohexanols, dicyclo-pentanol, arylaliphatic alcohols such as phenoxyethanol and nonylphenylethanol, and tetrahydrofurfuryl alcohols. Additionally it is possible to use alkoxylated derivatives of these alcohols. Suitable dihydric alcohols are, for example, alcohols such as ethylene glycol, propane-1,2-diol, propane-1, 3-diol, diethylene glycol, dipropylene glycol, the isomeric butanediols, neopentyl glycol, hexane-1,6-diol, 2-ethylhexanediol and tripropylene glycol or else alkoxylated derivatives of these alcohols. Suitable dihydric alcohols are hexane-1,6-diol, dipropylene glycol and tripropylene glycol. Suitable trihydric alcohols are glycerol or trimethylolpropane or their alkoxylated derivatives. Tetrahydric alcohols are pentaerythritol or its alkoxylated derivatives. In certain embodiments, as a constituent of component (A) or (B), before and/or during the reaction, stabilizers are added to inhibit polymerization, such as phenothiazine. Possible other stabilizers are phenols, such as para-methoxyphenyl, 2,5-di-tert-butylhydroquinone or 2,6-di-tert-butyl-4-methylphenol. Also suitable are N-oxyl compounds, such as 2,2,6,6-tetramethylpiperidine N-oxide (TEMPO) or its derivatives.

In order to stabilize the reaction mixture, in particular the unsaturated groups, against premature polymerization it is possible to pass an oxygen-containing gas, such as air, into and/or over the reaction mixture. The gas may have a very low moisture content, in order to prevent unwanted reaction in the presence of isocyanate.

The stabilizer component is used typically in amounts of 0.001% to 5.0% by weight, such as 0.01% to 2.0% by weight, or, in some cases, 0.05% to 1.0% by weight, based on the solids content of the process product.

In certain embodiments, the process is carried out at temperatures of not more than 100° C., such as 20 to 100° C., or, in some cases, 40 to 100° C. or 60 to 90° C.

The allophanate unsaturated urethane (meth)acrylate polymer, especially those based on the HDI, may, in some cases, have a shear viscosity at 23° C. of ≤150000 mPas, such as ≤80000 mPas. The allophanate unsaturated urethane (meth)acrylate polymer, especially those based on the HDI, may, in some cases, have a number-average molecular weight of 600 to 3000 g/mol, such as 650 to 1500 g/mol.

The allophanate unsaturated urethane (meth)acrylate polymer often contain less than 0.5% by weight of free di- and/or triisocyanate monomers, such as less than 0.3% by weight, or, in some cases, less than 0.1% by weight.

In certain embodiments, the foregoing allophanate unsaturated urethane (meth)acrylate polymer is present in the composition in an amount of up to 90 percent by weight, up to 80 percent by weight, or, in some cases, up to 70 percent by weight, and/or at least 10 percent by weight, at least 20 percent by weight, or, in some cases, at least 30 percent by weight, the foregoing weight percents being based on the total weight of the composition.

In some embodiments of the present invention, in addition to or in lieu of the previously described urethane (meth) acrylate polymer and/or the foregoing allophanate unsaturated urethane (meth)acrylate polymer, the composition comprises a lactone-containing (meth)acrylate. As used herein, "lactone-containing (meth)acrylate" refers to a (meth)acrylate that includes a lactone-derived moiety.

In some embodiments of the present invention, the composition comprises a lactone-containing (meth)acrylate that is the reaction product of a composition comprising: (i) a di- and/or polyisocyanate and (ii) a hydroxy functional lactone ester (meth)acrylate with a number average molecular weight of from 200 to 2000 g/mol and having the formula:

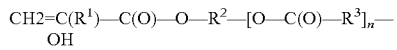

wherein n is an integer of from 1 to 5, $R^1$ is hydrogen or methyl, $R^2$ is an alkylene group or substituted alkylene group having from 2 to 10 carbon atoms and which may be substituted with one or more alkyl groups having from 1 to 12 carbon atoms, and $R^3$ is a straight or branched chain alkylene group of from 3 to 8 carbon atoms, and which may be substituted with one or more alkyl groups having from 1 to 12 carbon atoms. Such lactone-containing (meth)acrylates are described in U.S. Pat. No. 7,294,656 at col. 3, ln. 1 to col. 6, ln. 48, the cited portion of which being incorporated herein by reference.

In certain embodiments, the lactone-containing (meth) acrylate is present in the composition in an amount of up to 90 percent by weight, up to 80 percent by weight, or, in some cases, up to 70 percent by weight, and/or at least 10 percent by weight, at least 20 percent by weight, or, in some cases, at least 30 percent by weight, the foregoing weight percents being based on the total weight of the composition.

As indicated, in certain embodiments, the lactone-containing (meth)acrylate is a reaction product of a composition comprising: (i) a di- and/or polyisocyanate and (ii) a hydroxy functional lactone ester (meth)acrylate. Suitable polyisocyanates include substantially any organic di- and/or polyisocyanate. Aromatic, araliphatic, aliphatic or cycloaliphatic di- and/or polyisocyanates and mixtures of such isocyanates may be used. In some cases, the diisocyanate is of the formula $R^4(NCO)_2$, wherein $R^4$ represents an aliphatic hydrocarbon residue having 4 to 12 carbon atoms, a cycloaliphatic hydrocarbon residue having 6 to 15 carbon atoms, an aromatic hydrocarbon residue having 6 to 15 carbon atoms or an araliphatic hydrocarbon residue having 7 to 15 carbon atoms. Specific examples of suitable isocyanates include, but are not limited to, xylylene diisocyanate, tetramethylene diisocyanate, 1,4-diisocyantobutane, 1,12-diisocyanatododecane, hexamethylene diisocyanate, 2,3,3-trimethylhexamethylene diisocyanate, 1,4-cyclohexylene diisocyanate, 4,4'-dicyclohexylmethane diisocyanate, 4,4'-dicyclohexyl diisocyanate, 1-diisocyanato-3,3,5-trimethyl-5-isocyanatomethylcyclohexane (isophorone diisocyanate), 1,4-phenylene diisocyanate, 2,6-tolylene diisocyanate, 2,4-tolylene diisocyanate, 1,5-naphthylene diisocyanate, 2,4'- or 4,4'-diphenylmethane diisocyanate, 4,4'-diphenyldimethylmethane diisocyanate, a, a, a ', a'-tetramethyl-m- or p-xylylene diisocyanate, and triphenylmethane 4,4',4''-triisocyanate as well as mixtures thereof.

Polyisocyanates having isocyanurate, biuret, allophanate, uretidione or carbodiimide groups are also useful as the isocyanate component. Such polyisocyanates may have isocyanate functionalities of 3 or more. Such isocyanates are prepared by the trimerization or oligomerization of diisocyanates or by the reaction of diisocyanates with polyfunctional compounds containing hydroxyl or amine groups. In certain embodiments of the present invention, the polyisocyanate has allophonate groups and is prepared by the reaction of a diisocyanate with a polyfunctional compound containing hydroxyl or amine groups, such as any of the —OH functional compounds having a number average molecular weight of from 600 to 4000 g/mol described earlier.

Suitable hydroxy functional lactone ester (meth)acrylates (hereinafter "lactone-acrylate adducts") can be prepared by reacting an appropriate lactone with an acrylate or methacrylate acid ester.

Lactones employed in the preparation of the lactone-acrylate adducts often have the formula:

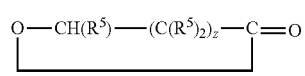

wherein $R^5$ is hydrogen or an alkyl group having from 1 to 12 carbon atoms, z is from 2 to 7, such as wherein z is 4 and at least 6 of the $R^5$'s are hydrogen with the remainder, if any, being alkyl groups. In some cases, none of the substituents contain more than 12 carbon atoms and the total number of carbon atoms in these substituents on the lactone ring does not exceed 12. Unsubstituted ε-caprolactone, i.e., where each $R^5$ is hydrogen, is a derivative of 6-hydroxyhexanoic acid. Both the unsubstituted and substituted ε-caprolactones are available by reacting the corresponding cyclohexanone with an oxidizing agent such as peracetic acid.

Substituted ε-caprolactones suitable for preparing the lactone-acrylate adducts include ε-monoalkylcapro-lactones wherein the alkyl groups contain from 1 to 12 carbon atoms, e.g., ε-methyl-caprolactone, ε-ethyl-caprolactone, ε-propyl-caprolactone and/or ε-dodecyl-caprolactone. Useful also are ε-dialkylcaprolactones in which the alkyl groups are substituted on the same or different carbon atoms, but not both on the omega carbon atoms. Also useful are the ε-trialkylcaprolactones wherein 2 or 3 carbon atoms in the lactone ring are substituted provided, though, that the omega carbon atom is not di-substituted. In some cases, the lactone is the ε-caprolactone wherein z in the above formula is 4 and each $R^5$ is hydrogen.

The acrylate or methacrylate acid esters utilized to prepare the lactone-acrylate adducts often contain from 1 to 3 acrylyl or α-substituted acrylyl groups and one or two hydroxyl groups. Such esters are commercially available or can be readily synthesized. Commercially available esters include the hydroxyalkyl acrylates or hydroxyalkyl methacrylates wherein the alkyl group contains from 2 to 10 carbon atoms, such as from 2 to 6 carbon atoms. The hydroxyalkyl acrylates and methacrylates have the following formula:

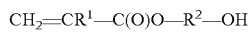

$$CH_2=CR^1-C(O)O-R^2-OH$$

wherein $R^1$ is hydrogen or methyl and $R^2$ is a linear or a branched alkylene group having from 2 to 10 carbon atoms, such as from 2 to 6 carbon atoms.

Examples of suitable hydroxyalkyl (meth)acrylates include 2-hydroxyethyl acrylate, 2-hydroxypropyl acrylate, 3-hydroxypropyl acrylate, 2-hydroxybutyl acrylate, 4-hydroxybutyl acrylate, 3-hydroxypentyl acrylate, 6-hydroxynonyl acrylate, 2-hydroxyethyl methacrylate, 2-hydroxypropyl methacrylate, 3-hydroxypropyl methacrylate, 2-hydroxybutyl methacrylate, 2-hydroxypentyl methacrylate, 5-hydroxypentyl methacrylate, 7-hydroxyheptyl methacrylate and 5-hydroxydecyl methacrylate.

In some cases, the lactone-acrylate adducts have the formula:

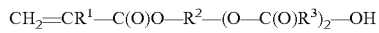

$$CH_2=CR^1-C(O)O-R^2-(O-C(O)R^3)_2-OH$$

wherein $R^1$, $R^2$, and $R^3$ are as described above.

The lactone-acrylate adduct may be prepared by reacting the lactone with the hydroxyalkyl acrylate in the presence of less than 200 parts per million of a catalyst. The catalysts which may be used include one or more organometallic compounds and other metallic compounds such as stannic chloride or ferric chloride and other Lewis or protonic acids. The reaction can be carried out at a temperature of from 100° C. to 400° C., such as from 120° C. to 130° C. The reaction may be carried out at atmospheric pressure, although higher or lower pressures may be used. The reaction is generally carried out in the presence of oxygen to inhibit polymerization of the hydroxyalkyl acrylate. The reaction is generally carried out for a period of from 2 to 20 hours. The reaction may be carried out in the presence of a suitable inhibitor to prevent polymerization of the hydroxyalkyl acrylate double bond. These inhibitors include the monomethyl ether of hydroquinone, benzoquinone, phenothiazine, methyl hydroquinone, 2,5-di-t-butylquinone, hydroquinone, benzoquinone and other common free radical inhibitors known in the art. The level of inhibitor used is often less than 1000 parts per million, such as less than 800 parts per million, and, in some cases, less than 600 parts per million. The molar ratio of the lactone to hydroxyl groups in the ester is from 1:0.1 to 1:5, such as from 1:0.3 to 1:3.

One example of a lactone-acrylate adduct that may be used is a caprolactone-2-hydroxyethyl acrylate adduct available as TONE M-100, which has the formula $CH_2=CH-C(O)O-CH_2-CH_2-(O-C(O)(CH_2)_5)_2-OH$.

While some embodiments of the invention contain two molecules of lactone, on the average, per (meth)acrylate group, useful products can have from one to five lactone units per (meth)acrylate group, or can be a mixture of compounds that contain from one to five lactone units. In addition to caprolactone, the lactone units could be derived from other lactones such as beta-propiolactone, delta-valerolactone, delta-butyrolactone, zeta-enantholactone, and eta-caprylolactone, or substituted lactones such as 6-methyl-epsilon-caprolactone, 3-methyl-epsilon-caprolactone, 5-methyl-epsilon-caprolactone, 4-methyl-delta-valerolactone, and 3,5-dimethyl-epsilon caprolactone.

For reaction with the isocyanate, the lactone-acrylate adduct is often heated to a temperature of from 40 to 100° C., such as 60° C. At this time, a catalytic amount of a urethane catalyst, e.g., dibutyl tin dilaurate, is added followed by addition of the isocyanate at a rate which maintains the desired reaction temperature. The amount of the isocyanate will be essentially equal (e.g., 1.01:1 to 1:1.01), on an equivalents basis, to the hydroxyl equivalents of the lactone-acrylate adduct.

When the addition is complete, the reaction is typically heated, e.g., to a temperature of 80° C. to 100° C., and held for from 2 to 4 hours or until the NCO content is <0.5% by weight as measured for example by titration with dibutyl amine. Thereafter, the product may be cooled prior to storage.

Further details as to the production of the lactone esters and/or the reaction products of the lactone esters with isocyanates can be found in U.S. Pat. Nos. 4,188,472, 4,340,497, 4,429,082, 4,504,635, 4,683,287, 6,465,539 and 6,534,128, WO 97/04881, WO 03/027162, and German Offenlegungsschrift 2,914,982, incorporated by reference herein.

In certain embodiments, the composition comprises (a) up to 70 percent by weight, such as up to 60 percent by weight, or, in some cases, up to 50 percent by weight, based on the total weight of (a) and (b), of an unsaturated (meth)acrylate polymer or oligomer which is the reaction product of a composition comprising: (i) an organic polyisocyanate, (ii) a polyol having a number average molecular weight of from 600 to 4000 g/mole, and (iii) at least one of: (1) a hydroxyl-functional (meth)acrylate, (2) an unsaturated (meth)acrylate polyol based on a polyester, a polyether, a polythioether, a polyacetal, a polycarbonate, a dimer fatty alcohol and/or an esteramide, in each case with a number average molecular weight of 400 to 8000 g/mole, the composition comprising an isocyanate to hydroxyl equivalent ratio of from 0.5:1 to 1:0.5, such as 0.9:1 to 1:0.9; (b) at least 30 percent by weight, such as at least 40 percent by weight, or, in some cases, at least 50 percent by weight, based on the total weight of the sum of (a) and (b), of at least one of: (i) any of the previously described an allophanate unsaturated urethane (meth)acrylates, different from component (a); and (ii) any of the previously described lactone-containing (meth) acrylates.

The compositions of the present invention also comprise a photoinitiator. A variety of photoinitiators can be utilized. The usual photoinitiators are the type that generate free radicals when exposed to radiation energy. Illustrative of suitable photoinitiators include 2,2-diethoxyacetophenone; 2- or 3- or 4-bromoacetophenone; 3- or 4-allyl-acetophenone; 2-acetonaphthone; benzaldehyde; benzoin; the alkyl benzoin ethers; benzophenone; benzoquinone; 1-chloroanthraquinone; p-diacetyl-benzene; 9,10-dibromoanthracene; 9,10-dichloroanthracene; 4,4-dichlorobenzophenone; thioxanthone; isopropyl-thioxanthone; methylthioxanthone; α,α,α-trichloro-para-t-butyl acetophenone; 4-methoxybenzophenone; 3-chloro-8-nonylxanthone; 3-iodo-7-methoxyxanthone; carbazole; 4-chloro-4'-benzylbenzophenone; fluoroene; fluoroenone; 1,4-naphthylphenylketone; 1,3-pentanedione; 2,2-di-sec.-butoxy acetophenone; dimethoxyphenyl acetophenone; propiophenone; isopropylthioxanthone; chlorothioxanthone; xanthone; and mixtures thereof. There are several suitable photoinitiators commercially available from Ciba including Irgacure® 184 (1-hydroxy-cyclohexyl-phenyl-ketone); Irgacure® 819 (bis(2,4,6-trimethylbenzoyl)-phenyl-phosphineoxide); Irgacure® 1850 (a 50/50 mixture of bis (2,6-dimethoxybenzoyl)-2,4,4-trimethylpentyl-phosphine oxide and 1-hydroxy-cyclohexyl-phenyl-ketone); Irgacure® 1700 (a 25/75 mixture of bis(2,6-dimethoxybenzoyl)-2,4,4-trimethylpentyl-phosphine oxide and 2-hydroxy-2-methyl-1-phenyl-propan-1-one); Irgacure® 907 (2-methyl-1-[4-(methylthio)phenyl]-2-morpholonopropan-1-one); Darocur® MBF (a pheny glyoxylic acid methyl ester) and Darocur® 4265 (a 50/50 mixture of bis(2,4,6-trimethylbenzoyl)-phenylphosphine-oxide, Irgacure® 2022 (a mixture of Irgacure® 819 (phosphine oxide, phenyl bis(2,4,6-trimethyl benzoyl)) (20 wt %), and Darocure® 1173 (2-hydroxy-2-methyl-1-phenyl-1-propanone) (80 wt %)) and 2-hydroxy-2-methyl-1-phenyl-propan-1-one). The foregoing lists are meant to be illustrative only and are not meant to exclude any suitable photoinitiators known to those skilled in the art. Those skilled in the art will know the concentrations at which photoinitiators are effectively employed and generally the concentration will not exceed 10% by weight of the radiation-curable coating composition.

Photoactivators can be used in combination with the aforementioned photoinitiators and synergistic effects are sometimes achieved when such combinations are used. Photoactivators are well known in the art and require no further description to make known what they are and the concentrations at which they are effective. Nonetheless, one can mention as illustrative of suitable photoactivators, methylamine, tributylamine, methyldiethanolamine, 2-aminoethylethanolamine, allylamine, cyclohexylamine, cyclopentadienylamine, diphenylamine, ditolylamine, trixylylamine, tribenzylamine, n-cyclohexylethyleneimine, piperidine, N-methylpiperazine, 2,2-dimethyl-1,3-bis(3-N-morpholinyl)-propionyloxy-propane, and mixtures thereof.

In certain embodiments of the present invention, the composition comprises a reactive diluent in addition to the reactive components described above. Suitable reactive diluents include, for example, vinyl ethers and mono-functional (meth)acrylate monomers, such as those that contain at least 4, at least 6, at least 8, at least 9, or, in some cases, at least 10 carbon atoms in the alkyl moiety (which may be linear, branched, alicyclic, substituted, or unsubstituted, for example). Exemplary reactive diluents include, without limitation, butyl (meth)acrylates, hexyl (meth)acrylate, pentyl (meth)acrylates, heptyl (meth)acrylates, octyl (meth) acrylates, 2-ethylhexyl (meth)acrylate, nonyl (meth)acrylates, decyl (meth)acrylates, bornyl (meth)acrylates, such as isobornyl (meth)acrylate, dicyclopentanyl (meth)acrylates, cyclohexyl (meth)acrylates, lauryl (meth)acrylates, stearyl (meth)acrylates, alkoxyalkyl (meth)acrylates, such as butoxyethyl acrylate, among many others.

In certain embodiments, the reactive diluent, such as a mono-functional (meth)acrylate monomer containing 8, 9, or 10 or more carbon atoms in the alkyl group, is present in an amount of up to 50 percent by weight, such as 10 to 50 percent by weight, or, in some cases, 30 to 50 percent by weight, based on the total weight of the composition.

In certain embodiments, the compositions described herein are substantially 100% solids, which, as used herein, means that the composition contains at least 90% solids, such as at least 95% solids, at least 99% solids, or, in some cases, 100% solids. As such, certain compositions of the present invention contain very little or no water and/or volatile organic compounds (VOC), such as organic solvents. In these embodiments, water and/or VOC is present in the composition in an amount of less than 10% by weight, less than 5% by weight, less than 1% by weight, or, in some cases, 0% by weight, based on the total weight of the composition. In fact, certain embodiments of the substantially 100% solids compositions described herein are of relatively low viscosity, meaning that they have a viscosity of less than 10,000 cps when measured according to ASTM Standard D 7395-07 using a Brookfield R/S Rheometer at 25° C., 100 s-1 shear rate for 2 minutes with a C-50-1 spindle.

The composition may further comprise known additives. Examples of these additives include adhesion promoters, wetting agents, flow control agents, antiskinning agents, antifoaming agents, matting agents, (such as silica, aluminum silicates and high-boiling waxes), viscosity regulators, pigments (including both organic and inorganic pigments), dyes, UV absorbers and stabilizers against thermal and oxidative degradation.

In the methods of the present invention, after applying the composition to at least a portion of a substrate, the composition is exposed to actinic radiation, such as UV radiation. The radiation can be provided by any suitable source such as UV lamps having with or reduced infrared emission or UV lamps fitted with filters to eliminate infrared emissions or so-called LEDs (light-emitting devices) emitting radiation in the wavelength noted. Particularly useful commercially available devices include: the Fusion and Nordson high-intensity microwave powered lamps (mercury, iron doped and gallium doped lamps), high-intensity standard arc lamps, the Panacol UV H-254 lamp (available from Panacol-Elosol GmbH)—a 250 W ozone-free, iron doped metal halide lamp with spectral wavelength of from 320 to 450 nm; Panacol UVF-450 (320 nm to 450 nm depending on the black, blue or clear filter used); Honle UV A HAND 250 CUL (available from Honle UV America Inc.)—emitting maximum intensity UV A range of −320 to 390 nm; PMP 250 watt metal halide lamp (available from Pro Motor Car Products Inc.); Cure-Tek UVA-400 (available from H&S Autoshot) which has a 400-watt metal halide bulb and the lamp assembly can be fitted with different filters like blue, light blue or clear to control/eliminate the infra-red radiation from the lamp source); Con-Trol-Cure Scarab-250 UV-A shop lamp system (available from UV Process Supply Inc.—has a 250 W iron doped metal halide lamp with a spectral wavelength output of 320 to 450 nm); Con-Trol- Cure—UV LED Cure-All 415 (available from UV Process Supply Inc.—spectral wavelength of 415 nm with a 2.5 to 7.95 W operating wattage range); Con-Trol-Cure—UV LED Cure-All 390 (available from UV Process Supply Inc.—spectral wavelength of 390 nm with a 2.76 to 9.28 W operating wattage range); UV H253 UV lamp (available from UV Light Technologies—the unit contained a 250 W iron doped metal halide lamp fitted with a black glass filter to produce a spectral wavelength of between 300 and 400 nm); Radion RX10 module curing using solid state high intensity UV light source from Phoseon Technology; Low intensity microwave UV System Model QUANT-18/36 (available from Quantum Technologies—UV Intensity range: 3-30 mW/cm2; UV Spectral range: 330-390 nm); WorkLED (available from Inretech Technologies using 400 nm LED arrays); Flashlight MC with 20×LED adapter (available from Inretech Technologies using 400 nm LEDs); and Phillips TL03 lamp with radiation output above 380 nm; and sunlight.

In the following examples all parts and percentages are weight percentages, unless otherwise indicated. Unless otherwise indicated, elastomeric film thickness was 55 mils in each Example. For all Examples, elastomeric films were tested for tensile and elongation according to ASTM D-412, Die C×head speed 20 in/min; tear according to ASTM D-624. Results shown for elongation are in %, tensile is in psi, and tear is in pli. By the term fully cured is meant cured to tack free.

EXAMPLES

Materials used in the Examples: "2683"—Desmolux® XP 2683/1 (Unsaturated aliphatic urethane acrylate, Bayer MaterialScience LLC, Pittsburgh, Pa.); "2491"—Desmolux® XP 2491 (Unsaturated aliphatic urethane acrylate, Bayer MaterialScience LLC); "2740"—Desmolux® XP 2740 (Unsaturated aliphatic allophanate urethane acrylate, Bayer MaterialScience LLC); "2513"-Desmolux® XP 2513 (Unsaturated aliphatic urethane acrylate based on a hydroxyl functional lactone ester (meth)acrylate, Bayer MaterialScience AG, Leverkusen, Germany); "I"-Desmodur® I (isophorone diisocyanate, Bayer MaterialScience, LLC); "H"—Desmodur® H (1,6-hexamethylene diisocyanate, Bayer MaterialScience, LLC); "3400"—Desmodur® N 3400 (polyisocyanate based on HDI and containing predominantly uretdione groups, Bayer MaterialScience, LLC); "TDS"—Mondur TDS (high 2,4-isomer toluene diisocyanate, Bayer MaterialScience LLC); "ML"—Mondur ML (diphenylmethane diisocyanate, Bayer MaterialScience LLC); "12A"—Bisomer Permcure 12A (hydroxyethylcaprolactone acrylate); SR-495 (caprolactone acrylate, Sartomer USA, LLC, Exton, Pa.); SR-238 (1,6 hexanediol diacrylate, Sartomer USA, LLC); SR-506 (isobornyl acrylate, Sartomer USA, LLC); "M100"—Miramer M100 (caprolactone acrylate, Miwon Specialty Chemical Co., Ltd, Korea); "T-9"—Dabco T-9 (stannous octoate, Air Products and Chemicals, Inc., Allentown, Pa.); "T-12"—Dabco T-12 (dibutyltindilaurate, Air Products and Chemicals, Inc.); "M-100"—Tone M100 (caprolactone (meth)acrylate monomer, Dow Chemical, Midland, Mich.); "BHT"—butylated hydroxytoluene; "HEA"—2-hydroxyethylacrylate; "4200"—Acclaim 4200 (unsaturated polypropylene glycol having a molecular weight of 4000, Bayer MaterialScience LLC); "2220"—Acclaim 2220N (15 wt. % low unsaturation polypropylene glycol having average molecular weight of 2000, Bayer MaterialScience LLC); PPG 2000 (2000 average molecular weight polypropylene glycol, Bayer MaterialScience LLC); "1035-55"—Desmophen S-1035-55 (saturated polyester polyol having a hydroxyl number of 55 and an Equivalent Weight of 1002, Bayer MaterialScience LLC); "105 55"-Desmophen S-105-55 (polyester polyol having an average molecular weight of about 2000, Bayer MaterialScience, LLC); "C-2200"—Desmophen C 2200 (hexane diol-based polycarbonate, MW 2000, OH No. 56; Bayer MaterialScience LLC); "1019-55"—Rucoflex S-1019-55 (polyester diol, average molecular weight about 3000, Bayer MaterialScience LLC); "1000"—Terathane 1000 (polyether polyol, average molecular weight about 1000 and OH No. 112.5, E.I. DuPont de Nemours); "2022"—Irgacure® 2022 (photoinitiator available from BASF, Inc.); "754"—Irgacure® 754 (photoinitiator available from BASF, Inc.); "4265"—Irgacure® 4265 (photoinitiator available from BASF, Inc.); "1119"—Genomer® 1119 (4-tert-butylcyclohexyl acrylate; Rahn USA Corp.); "1122"—Genomer® 1122 (2-propenoic acid, 2-(((Butylamino)carbonyl)oxy) ethyl ester; Rahn USA Corp); "5161"—Genomer® 5161 (acrylated amine synergist; Rahn USA Corp.); Doublecure® 1256 (photoinitiator; Double Bond Chemical Ind., Co., Ltd.).

Example 1

A UV curable composition was prepared using the components in Table 1.

TABLE 1

| Ingredient | Amount (% by weight) |
|---|---|
| 2683 | 97.09 |
| 2022 | 2.91 |
| Formulation Results | |
| PVC | 0 |
| Weight Solids | 100 |
| P/B | 0 |
| Volume Solids | 100 |
| VOC | 0 |

The composition was prepared by adding the 2683 and 2022 into a mixer and mixing the components until a homogeneous solution was achieved. This composition was then drawn down onto a 24 inch by 24 inch glass plate and then exposed to a Fusion Light Hammer UV processor at a line speed of 10 feet per minute. The UV light exposure was at an intensity 4.4 UV A, 2.7 UV B, 0.4 UVC and 11.5 UVV Joules per cm$^2$. The specific UV light configuration was V bulb and then H bulb. The resultant elastomeric film had the following properties: Tensile=10,395; % Elongation=3.7; Tear Resistance of 489.40. The elastomeric film was fully cured and did not require any covering to prevent oxygen inhibition.

Example 2

A UV curable composition was prepared using components in Table 2.

TABLE 2

| Ingredient | Amount (% by weight) |
|---|---|
| 2740 | 48.54 |
| 2683 | 48.54 |
| 2022 | 2.91 |

TABLE 2-continued

| Ingredient | Amount (% by weight) |
|---|---|
| Formulation Results | |
| PVC | 0 |
| Weight Solids | 100 |
| P/B | 0 |
| Volume Solids | 100 |
| VOC | 0 |

The composition was prepared by adding the 2683, 2740, and 2022 into a mixer and mixing the components until a homogeneous solution was achieved. This composition was then drawn down onto a 24 inch by 24 inch glass plate and then exposed to a Fusion Light Hammer UV processor at a line speed of 10 feet per minute. The UV light exposure was at an intensity 4.4 UV A, 2.7 UV B, 0.4 UVC and 11.5 UVV Joules per cm$^2$. The specific UV light configuration was V bulb and then H bulb. The resultant elastomeric film had the following properties: Tensile=9615; % Elongation=5.9; Tear Resistance of 577. The elastomeric film was fully cured and did not require any covering to prevent oxygen inhibition.

Example 3

A UV curable composition was prepared using the components in Table 3.

The composition was prepared by adding the 2683, 2740, and 2022 into a mixer and mixing the components until a homogeneous solution was achieved. This composition was then drawn down onto a 24 inch by 24 inch glass plate and then exposed to a Fusion Light Hammer UV processor at a line speed of 10 feet per minute. The UV light exposure was at an intensity 4.4 UV A, 2.7 UV B, 0.4 UVC and 11.5 UVV Joules per cm$^2$. The specific UV light configuration was V bulb and then H bulb. The resultant UV curable elastomeric film possessed the following mechanical properties: Tensile=10895; % Elongation=5.1; Tear Resistance of 706. The resultant elastomeric film was fully cured and did not require any covering to prevent oxygen inhibition.

TABLE 3

| Ingredient | Amount (% by weight) |
|---|---|
| 2740 | 29.13 |
| 2683 | 67.96 |
| 2022 | 2.91 |
| Formulation Results | |
| PVC | 0 |
| Weight Solids | 100 |
| P/B | 0 |
| Volume Solids | 100 |
| VOC | 0 |

Example 4

A UV curable composition was prepared using the components in Table 4.

TABLE 4

| Ingredient | Amount (% by weight) |
|---|---|
| 2513 | 41.26 |
| 2683 | 41.26 |

TABLE 4-continued

| Ingredient | Amount (% by weight) |
|---|---|
| SR-506 | 14.56 |
| 2022 | 2.91 |
| Formulation Results | |
| PVC | 0 |
| Weight Solids | 100 |
| P/B | 0 |
| Volume Solids | 100 |
| VOC | 0 |

The composition was prepared by adding the 2513, 2683, SR-506, and 2022 into a mixer and mixing the components until a homogeneous solution was achieved. This composition was then drawn down onto a 24 inch by 24 inch glass plate and then exposed to a Fusion Light Hammer UV processor at a line speed of 10 feet per minute. The UV light exposure was at an intensity 4.4 UV A, 2.7 UV B, 0.4 UVC and 11.5 UVV Joules per cm$^2$. The specific UV light configuration was V bulb and then H bulb. The resultant UV curable elastomeric film had the following mechanical properties: Tensile=7225; % Elongation=5.4; Tear Resistance of 492. The resultant elastomeric film was fully cured and did not require any covering to prevent oxygen inhibition.

Example 5

A UV curable composition was prepared using the components in Table 5.

TABLE 5

| Ingredient | Amount (% by weight) |
|---|---|
| 2513 | 33.02 |
| 2683 | 33.02 |
| SR-506 | 28.3 |
| 2022 | 5.66 |
| Formulation Results | |
| PVC | 0 |
| Weight Solids | 100 |
| P/B | 0 |
| Volume Solids | 100 |
| VOC | 0 |

The composition was prepared by adding the 2513, 2683, SR-506, and 2022 into a mixer and mixing the components until a homogeneous solution was achieved. This composition was then drawn down onto a 24 inch by 24 inch glass plate and then exposed to a Fusion Light Hammer UV processor at a line speed of 10 feet per minute. The UV light exposure was at an intensity 4.4 UV A, 2.7 UV B, 0.4 UVC and 11.5 UVV Joules per cm$^2$. The specific UV light configuration was V bulb and then H bulb. The resultant elastomeric film had the following properties: Tensile=7314.8; % Elongation=8.33; Tear Resistance of 1051.3. The resultant elastomeric film was fully cured and did not require any covering to prevent oxygen inhibition.

Example 6

A UV curable composition was prepared based on a composition comprised of an aliphatic oligomer produced according to the following procedure: 141.43 grams of isophorone diisocyanate and 126.28 grams of Desmophen® S 1019 (saturated polyester polyol; Bayer MaterialScience LLC) were charged to a reactor. The components were stirred and heated to 75° C. under nitrogen atmosphere. The temperature was monitored and once the exotherm was over and the temperature was stable, it was maintained at 75° C. Then, 0.16 grams of T-9 was added and the mixture was heated to 110° C. until the % NCO for theoretical allophanate formation was reached. The reaction mixture was cooled to 70° C. and 173.76 grams of SR-495 and 320.12 grams of SR-506 were added. The temperature was maintained at 70° C. until % NCO <0.2%. The UV curable composition included the components presented in Table 6.

TABLE 6

| Ingredient | Amount (% by weight) |
|---|---|
| Aliphatic Oligomer of Example 6 | 97.09 |
| 2022 | 2.91 |
| Formulation Results | |
| PVC | 0 |
| Weight Solids | 100 |
| P/B | 0 |
| Volume Solids | 100 |
| VOC | 0 |

The composition was prepared by adding the oligomer and 2022 into a mixer and mixing the components until a homogeneous solution was achieved. This composition was then drawn down onto a 24 inch by 24 inch glass plate and then exposed to a Fusion Light Hammer UV processor at a line speed of 10 feet per minute. The UV light exposure was at an intensity 4.4 UV A, 2.7 UV B, 0.4 UVC and 11.5 UVV Joules per cm$^2$. The specific UV light configuration was V bulb and then H bulb. The resultant elastomeric film had the following properties: Tensile=1,677.6; % Elongation=124.5; Tear Resistance of 261. The resultant elastomeric film was fully cured and did not require any covering to prevent oxygen inhibition.

Examples 7-18

Aliphatic oligomers were produced according to the following procedures. For Examples 7, 11-13, and 17-18, using the materials and amounts (% by weight) in Table 7A, a reaction flask with a nitrogen pad attached, the isocyanate, reactive diluent, catalyst, and stabilizer were added and stirred. The polyol was then added keeping the exothermic reaction to <70° C. Once all the polyol had been added, and the temperature had stabilized, the nitrogen pad was removed and the reaction was exposed to dry air. The hydroxyl acrylate was then added while keeping the temperature <70° C. Once all of the hydroxyl acrylate had been added, then temperature of the reactor contents was maintained until the % NCO was ≤0.5%. Catalyst was added as needed to drive the reaction to completion.

For Examples 8-10 and 14-16, using the materials and amounts (% by weight) in Table 7A, the isocyanate, reactive diluent, catalyst, and stabilizer were added to a reaction flask and stirred. The polyol was then added keeping the exothermic reaction to <70° C. Once all the polyol had been added, and the temperature had stabilized, the hydroxyl acrylate was added while keeping the temperature <70° C. Once all of the hydroxyl acrylate had been added, then temperature of the reactor contents was maintained until the % NCO was ≤0.5%.

TABLE 7A

| Oligomer | I | H | 3400 | TDS | ML | 12A | SR-495 |
|---|---|---|---|---|---|---|---|
| 13 | — | — | — | 10.02 | — | 33.95 | — |
| 9 | — | — | 32.21 | — | — | — | — |
| 15 | 20.08 | — | — | — | — | — | — |
| 12 | — | — | — | 16.06 | — | — | — |
| 14 | 18.96 | — | — | — | — | — | — |
| 7 | — | — | — | — | 22.24 | — | — |
| 18 | — | — | — | — | 22.01 | — | — |
| 11 | — | — | — | 15.83 | — | — | — |
| 10 | — | — | 20.92 | — | — | — | — |
| 17 | — | — | — | — | 13.86 | — | — |
| 16 | 12.51 | — | — | — | — | — | — |
| 8 | — | 7.31 | 7.31 | — | — | — | 31.49 |

| Oligomer | SR-238 | SR-506 | M100 | T-9 | T-12 | M-100 | BHT |
|---|---|---|---|---|---|---|---|
| 13 | — | 40.04 | — | — | — | — | 0.1 |
| 9 | — | 40 | — | — | 0.1 | — | 0.1 |
| 15 | — | 40 | — | — | 0.1 | — | 0.1 |
| 12 | — | 40.04 | — | — | 0.01 | — | 0.1 |
| 14 | — | 40 | — | — | 0.1 | — | 0.1 |
| 7 | — | 40 | — | — | 0.02 | — | 0.1 |
| 18 | — | 40 | — | — | 0.02 | — | 0.1 |
| 11 | — | 40 | — | — | 0.05 | — | 0.1 |
| 10 | — | 40 | 33.92 | — | 0.1 | — | 0.1 |
| 17 | — | 40 | 33.96 | — | 0.02 | — | 0.1 |
| 16 | — | 40 | 33.92 | — | 0.1 | — | 0.1 |
| 8 | 20 | — | — | — | 0.1 | — | 0.1 |

| Oligomer | HEA | 4200 | 2220 | PPG 2000 | 1035-55 | 105-55 | C-2200 |
|---|---|---|---|---|---|---|---|
| 13 | — | — | — | 15.88 | — | — | — |
| 9 | 18.34 | — | — | 9.25 | — | — | — |
| 15 | 18.34 | — | — | 21.38 | — | — | — |
| 12 | 18.36 | — | — | 25.44 | — | — | — |
| 14 | 18.34 | 22.5 | — | — | — | — | — |
| 7 | 18.36 | — | — | — | — | — | 19.27 |
| 18 | 18.36 | — | 19.51 | — | — | — | — |
| 11 | 18.36 | — | 25.66 | — | — | — | — |
| 10 | — | — | — | — | — | — | — |
| 17 | — | — | — | — | — | 12.06 | — |
| 16 | — | — | — | — | — | 13.37 | — |
| 8 | — | — | — | — | 33.69 | — | — |

| Oligomer | 1019-55 | 1000 |
|---|---|---|
| 13 | — | — |
| 9 | — | — |
| 15 | — | — |
| 12 | — | — |
| 14 | — | — |
| 7 | — | — |
| 18 | — | — |
| 11 | — | — |
| 10 | — | 4.97 |
| 17 | — | — |
| 16 | — | — |
| 8 | — | — |

Example 7

A UV curable composition was prepared using the components in Table 7.

TABLE 7

| Ingredient | Amount (% by weight) |
|---|---|
| Oligomer 7 | 94.34 |
| 2022 | 5.66 |
| Formulation Results | |
| PVC | 0 |
| Weight Solids | 100 |
| P/B | 0 |

TABLE 7-continued

| Ingredient | Amount (% by weight) |
|---|---|
| Volume Solids | 100 |
| VOC | 0 |

The composition was prepared by adding the Oligomer 7 and 2022 into a mixer and mixing the components until a homogeneous solution was achieved. This composition was then drawn down onto a 24 inch by 24 inch glass plate and then exposed to a Fusion Light Hammer UV processor at a line speed of 10 feet per minute. The UV light exposure was at an intensity 4.4 UV A, 2.7 UV B, 0.4 UVC and 11.5 UVV Joules per $cm^2$. The specific UV light configuration was V bulb and then H bulb. The resultant elastomeric film had the following properties: Tensile=4893.77; % Elongation=3.77; Tear Resistance of 193.10. The resultant elastomeric film was fully cured and did not require any covering to prevent oxygen inhibition.

Example 8

A UV curable composition was prepared using the components in Table 8.

TABLE 8

| Ingredient | Amount (% by weight) |
|---|---|
| Oligomer 8 | 97.09 |
| 2022 | 2.91 |
| Formulation Results | |
| PVC | 0 |
| Weight Solids | 100 |
| P/B | 0 |
| Volume Solids | 100 |
| VOC | 0 |

The composition was prepared by adding the Oligomer 8 and 2022 into a mixer and mixing the components until a homogeneous solution was achieved. This composition was then drawn down onto a 24 inch by 24 inch glass plate and then exposed to a Fusion Light Hammer UV processor at a line speed of 10 feet per minute. The UV light exposure was at an intensity 4.4 UV A, 2.7 UV B, 0.4 UVC and 11.5 UVV Joules per $cm^2$. The specific UV light configuration was V bulb and then H bulb. The resultant elastomeric film had the following properties: Tensile=404; % Elongation=16.8; Tear Resistance of 294. The resultant elastomeric film was fully cured and did not require any covering to prevent oxygen inhibition. The viscosity of the base resin was 29.47 mPas at 25° C.

Example 9

A UV curable composition was prepared using the components in Table 9.

The composition was prepared by adding the Oligomer 9 and 2022 into a mixer and mixing the components until a homogeneous solution was achieved. This composition was then drawn down onto a 24 inch by 24 inch glass plate and then exposed to a Fusion Light Hammer UV processor at a line speed of 10 feet per minute. The UV light exposure was at an intensity 4.4 UV A, 2.7 UV B, 0.4 UVC and 11.5 UVV Joules per $cm^2$. The specific UV light configuration was V bulb and then H bulb. The resultant elastomeric film had the following properties: Tensile=4700; % Elongation=3.7; Tear Resistance of 235. The resultant elastomeric film was fully cured and did not require any covering to prevent oxygen inhibition. The viscosity of the base resin was 29.47 mPas at 25° C.

TABLE 9

| Ingredient | Amount (% by weight) |
|---|---|
| Oligomer 9 | 94.34 |
| 2022 | 5.66 |
| Formulation Results | |
| PVC | 0 |
| Weight Solids | 100 |
| P/B | 0 |
| Volume Solids | 100 |
| VOC | 0 |

Example 10

A UV curable composition was prepared using the components in Table 10.

TABLE 10

| Ingredient | Amount (% by weight) |
|---|---|
| Oligomer 10 | 94.34 |
| 2022 | 5.66 |
| Formulation Results | |
| PVC | 0 |
| Weight Solids | 100 |
| P/B | 0 |
| Volume Solids | 100 |
| VOC | 0 |

The composition was prepared by adding the Oligomer 10 and 2022 into a mixer and mixing the components until a homogeneous solution was achieved. This composition was then drawn down onto a 24 inch by 24 inch glass plate and then exposed to a Fusion Light Hammer UV processor at a line speed of 10 feet per minute. The UV light exposure was at an intensity 4.4 UV A, 2.7 UV B, 0.4 UVC and 11.5 UVV Joules per $cm^2$. The specific UV light configuration was V bulb and then H bulb. The elastomeric resultant film had the following properties: Tensile=1020; % Elongation=71; Tear Resistance of 57. The resultant elastomeric film was fully cured and did not require any covering to prevent oxygen inhibition.

Example 11

A UV curable composition was prepared using the components in Table 11.

TABLE 11

| Ingredient | Amount (% by weight) |
|---|---|
| Oligomer 11 | 94.34 |
| 2022 | 5.66 |
| Formulation Results | |
| PVC | 0 |
| Weight Solids | 100 |
| P/B | 0 |
| Volume Solids | 100 |
| VOC | 0 |

The composition was prepared by adding the Oligomer 11 and 2022 into a mixer and mixing the components until a homogeneous solution was achieved. This composition was then drawn down onto a 24 inch by 24 inch glass plate and then exposed to a Fusion Light Hammer UV processor at a line speed of 10 feet per minute. The UV light exposure was at an intensity 4.4 UV A, 2.7 UV B, 0.4 UVC and 11.5 UVV Joules per $cm^2$. The specific UV light configuration was V bulb and then H bulb. The resultant elastomeric film had the following properties; Tensile=3089; % Elongation=6; Tear Resistance of 121. The resultant elastomeric film was fully cured and did not require any covering to prevent oxygen inhibition.

Example 12

A UV curable composition was prepared using the components in Table 12.

The composition was prepared by adding the Oligomer 12 and 2022 into a mixer and mixing the components until a homogeneous solution was achieved. This composition was then drawn down onto a 24 inch by 24 inch glass plate and then exposed to a Fusion Light Hammer UV processor at a line speed of 10 feet per minute. The UV light exposure was at an intensity 4.4 UV A, 2.7 UV B, 0.4 UV C and 11.5 UVV Joules per $cm^2$. The specific UV light configuration was V bulb and then H bulb. The resultant elastomeric film had the following properties; Tensile=2800; % Elongation=2.5; Tear Resistance of 213. The resultant elastomeric film was fully cured and did not require any covering to prevent oxygen inhibition.

TABLE 12

| Ingredient | Amount (% by weight) |
|---|---|
| Oligomer 12 | 94.34 |
| 2022 | 5.66 |
| Formulation Results | |
| PVC | 0 |
| Weight Solids | 100 |
| P/B | 0 |
| Volume Solids | 100 |
| VOC | 0 |

Example 13

A UV curable composition was prepared using the components in Table 13.

TABLE 13

| Ingredient | Amount (% by weight) |
|---|---|
| Oligomer 13 | 94.34 |
| 2022 | 5.66 |
| Formulation Results | |
| PVC | 0 |
| Weight Solids | 100 |
| P/B | 0 |
| Volume Solids | 100 |
| VOC | 0 |

The composition was prepared by adding the Oligomer 13 and 2022 into a mixer and mixing the components until a homogeneous solution was achieved. This composition was then drawn down onto a 24 inch by 24 inch glass plate and then exposed to a Fusion Light Hammer UV processor at a line speed of 10 feet per minute. The UV light exposure was at an intensity 4.4 UV A, 2.7 UV B, 0.4 UVC and 11.5 UVV Joules per $cm^2$. The specific UV light configuration was V bulb and then H bulb. The resultant elastomeric film had the following properties; Tensile=847; % Elongation=88; Tear Resistance of 42. The resultant elastomeric film was fully cured and did not require any covering to prevent oxygen inhibition.

Example 14

A UV curable composition was prepared using the components in Table 14.

TABLE 14

| Ingredient | Amount (% by weight) |
|---|---|
| Oligomer 14 | 94.34 |
| 2022 | 5.66 |
| Formulation Results | |
| PVC | 0 |
| Weight Solids | 100 |
| P/B | 0 |
| Volume Solids | 100 |
| VOC | 0 |

The composition was prepared by adding the Oligomer 14 and 2022 into a mixer and mixing the components until a homogeneous solution was achieved. This composition was then drawn down onto a 24 inch by 24 inch glass plate and then exposed to a Fusion Light Hammer UV processor at a line speed of 10 feet per minute. The UV light exposure was at an intensity 4.4 UV A, 2.7 UV B, 0.4 UVC and 11.5 UVV Joules per $cm^2$. The specific UV light configuration was V bulb and then H bulb. The resultant elastomeric film had the following properties: Tensile=4155; % Elongation=4.4; Tear Resistance of 150. The resultant elastomeric film was fully cured and did not require any covering to prevent oxygen inhibition.

Example 15

A UV curable composition was prepared using the components in Table 15.

The composition was prepared by adding the Oligomer 15 and 2022 into a mixer and mixing the components until a homogeneous solution was achieved. This composition was then drawn down onto a 24 inch by 24 inch glass plate and then exposed to a Fusion Light Hammer UV processor at a line speed of 10 feet per minute. The UV light exposure was at an intensity 4.4 UV A, 2.7 UV B, 0.4 UV C and 11.5 UVV Joules per $cm^2$. The specific UV light configuration was V bulb and then H bulb. The resultant cured elastomeric film had the following properties: Tensile=2690; % Elongation=1; Tear Resistance of 237. The resultant elastomeric film was fully cured and did not require any covering to prevent oxygen inhibition.

TABLE 15

| Ingredient | Amount (% by weight) |
|---|---|
| Oligomer 15 | 94.34 |
| 2022 | 5.66 |
| Formulation Results | |
| PVC | 0 |
| Weight Solids | 100 |

TABLE 15-continued

| Ingredient | Amount (% by weight) |
| --- | --- |
| P/B | 0 |
| Volume Solids | 100 |
| VOC | 0 |

Example 16

A UV curable composition was prepared using the components in Table 16.

TABLE 16

| Ingredient | Amount (% by weight) |
| --- | --- |
| Oligomer 16 | 94.34 |
| 2022 | 5.66 |
| Formulation Results | |
| PVC | 0 |
| Weight Solids | 100 |
| P/B | 0 |
| Volume Solids | 100 |
| VOC | 0 |

The composition was prepared by adding the Oligomer 16 and 2022 into a mixer and mixing the components until a homogeneous solution was achieved. This composition was then drawn down onto a 24 inch by 24 inch glass plate and then exposed to a Fusion Light Hammer UV processor at a line speed of 10 feet per minute. The UV light exposure was at an intensity 4.4 UV A, 2.7 UV B, 0.4 UV C and 11.5 UVV Joules per cm$^2$. The specific UV light configuration was V bulb and then H bulb. The resultant elastomeric film had the following properties; Tensile=1705; % Elongation=88; Tear Resistance of 117. The resultant elastomeric film was fully cured and did not require any covering to prevent oxygen inhibition.

Example 17

A UV curable composition was prepared using the components in Table 17.

TABLE 17

| Ingredient | Amount (% by weight) |
| --- | --- |
| Oligomer 17 | 94.34 |
| 2022 | 5.66 |
| Formulation Results | |
| PVC | 0 |
| Weight Solids | 100 |
| P/B | 0 |
| Volume Solids | 100 |
| VOC | 0 |

The composition was prepared by adding the Oligomer 17 and 2022 into a mixer and mixing the components until a homogeneous solution was achieved. This composition was then drawn down onto a 24 inch by 24 inch glass plate and then exposed to a Fusion Light Hammer UV processor at a line speed of 10 feet per minute. The UV light exposure was at an intensity 4.4 UV A, 2.7 UV B, 0.4 UV C and 11.5 UVV Joules per cm$^2$. The specific UV light configuration was V bulb and then H bulb. The resultant elastomeric film had the following properties; Tensile=1931; % Elongation=83; Tear Resistance of 147. The resultant elastomeric film was fully cured and did not require any covering to prevent oxygen inhibition.

Example 18

A UV curable composition was prepared using the components in Table 18.

The composition was prepared by adding the Oligomer 18 and 2022 into a mixer and mixing the components until a homogeneous solution was achieved. This composition was then drawn down onto a 24 inch by 24 inch glass plate and then exposed to a Fusion Light Hammer UV processor at a line speed of 10 feet per minute. The UV light exposure was at an intensity 4.4 UV A, 2.7 UV B, 0.4 UV C and 11.5 UVV Joules per cm$^2$. The specific UV light configuration was V bulb and then H bulb. The resultant elastomeric film had the following properties; Tensile=2306; % Elongation=82; Tear Resistance of 209. The elastomeric film was fully cured and did not require any covering to prevent oxygen inhibition.

TABLE 18

| Ingredient | Amount (% by weight) |
| --- | --- |
| Oligomer 18 | 94.34 |
| 2022 | 5.66 |
| Formulation Results | |
| PVC | 0 |
| Weight Solids | 100 |
| P/B | 0 |
| Volume Solids | 100 |
| VOC | 0 |

Example 19

A UV curable composition was prepared using the components in Table 19.

The composition was prepared by blending 2513, 2683, 1119, 1122, 1256 and 5161 into a mixer and mixing the components until a homogeneous solution was achieved. This was then drawn down onto a 6 inch by 12 inch glass plate at a thickness of 10 mils and then exposed to a Fusion UV processor at a line speed of 10 feet per minute. The UV light exposure was at an intensity of 4.4 UV A, 2.7 UV B, 0.4 UV C and 11.5 UVV Joules per cm$^2$. The specific UV light configuration was V bulb and then H bulb. The resultant elastomeric film had the following mechanical properties: Tensile=3026; % Elongation=63; Tear Resistance=238. The resultant elastomeric film was fully cured and did not require any covering to prevent oxygen inhibition.

TABLE 19

| Ingredient | Amount (% by weight) |
| --- | --- |
| 2513 | 33 |
| 2683 | 33 |
| 1119 | 17 |
| 1122 | 17 |
| 5161 | 5 |
| 1256 | 5 |
| Formulation Results | |
| PVC | 0 |
| Weight Solids | 100 |

TABLE 19-continued

| Ingredient | Amount (% by weight) |
| --- | --- |
| P/B | 0 |
| Volume Solids | 100 |
| VOC | 0 |

Example 20

A UV cured elastomeric article with a thickness of 75 mils was prepared using the components in Table 20.

TABLE 20

| Ingredient | Amount (% by weight) |
| --- | --- |
| 2513 | 33 |
| 2683 | 33 |
| 1119 | 17 |
| 1122 | 17 |
| 5161 | 5 |
| 1256 | 5 |
| Formulation Results | |
| PVC | 0 |
| Weight Solids | 100 |
| P/B | 0 |
| Volume Solids | 100 |
| VOC | 0 |

The composition was prepared by blending 2513, 2683, 1119, 1122, 1256 and 5161 into a mixer and mixing the components until a homogeneous solution was achieved. This composition was then drawn down onto a 6 inch by 12 inch glass plate and then exposed to a Fusion UV processor at a line speed of 10 feet per minute. The UV light exposure was at an intensity 4.4 UV A, 2.7 UV B, 0.4 UV C and 11.5 UVV Joules per cm$^2$. The specific UV light configuration was V bulb and then H bulb. The resultant elastomeric film thickness was 75 mils. The resultant UV cured elastomeric article had the following properties: Tensile=2283; % Elongation=67; Tear Resistance of 225. The resultant UV cured elastomeric article was fully cured, optically clear and did not require any covering to prevent oxygen inhibition.

Example 21

A UV curable composition was prepared using the components in Table 21.

The composition was prepared by adding the 2513, 2491, 2022 and SR-506 into a mixer and mixing the components until a homogeneous solution was achieved. This composition was then drawn down onto a 24 inch by 24 inch glass plate and then exposed to a Fusion Light Hammer UV processor at a line speed of 10 feet per minute. The UV light exposure was at an intensity 4.4 UV A, 2.7 UV B, 0.4 UV C and 11.5 UVV Joules per cm$^2$. The specific UV light configuration was V bulb and then H bulb. The resultant elastomeric film had the following properties; Tensile=3073; % Elongation=25; Tear Resistance of 438. The resultant elastomeric film was fully cured and did not require any covering to prevent oxygen inhibition.

TABLE 21

| Ingredient | Amount (% by weight) |
| --- | --- |
| 2513 | 54.61 |
| 2491 | 1.07 |
| 2022 | 1.48 |
| SR-506 | 42.84 |
| Formulation Results | |
| PVC | 0 |
| Weight Solids | 100 |
| P/B | 0 |
| Volume Solids | 100 |
| VOC | 0 |

Example 22

A UV curable composition was prepared using the components in Table 22.

The composition was prepared by adding the 2513, XP 2491, 2022 and SR-506 into a mixer and mixing the components until a homogeneous solution was achieved. This composition was then drawn down onto a 24 inch by 24 inch glass plate and then exposed to a Fusion Light Hammer UV processor at a line speed of 10 feet per minute. The UV light exposure was at an intensity 4.4 UV A, 2.7 UV B, 0.4 UV C and 11.5 UVV Joules per cm$^2$. The specific UV light configuration was V bulb and then H bulb. The resultant elastomeric film had the following properties; Tensile=3382; % Elongation=14; Tear Resistance of 469. The resultant elastomeric film was fully cured and did not require any covering to prevent oxygen inhibition.

TABLE 22

| Ingredient | Amount (% by weight) |
| --- | --- |
| 2513 | 54.88 |
| 2491 | 1.08 |
| 2022 | 0.99 |
| SR-506 | 43.05 |
| Formulation Results | |
| PVC | 0 |
| Weight Solids | 100 |
| P/B | 0 |
| Volume Solids | 100 |
| VOC | 0 |

Example 23

A UV curable composition was prepared using the components in Table 23.

The composition was prepared by adding the 2513, 2491, 754 and SR-506 into a mixer and mixing the components until a homogeneous solution was achieved. This composition was then drawn down onto a 24 inch by 24 inch glass plate and then exposed to a Fusion Light Hammer UV processor at a line speed of 10 feet per minute. The UV light exposure was at an intensity 4.4 UV A, 2.7 UV B, 0.4 UV C and 11.5 UVV Joules per cm$^2$. The specific UV light configuration was V bulb and then H bulb. The resultant elastomeric film had the following mechanical properties; Tensile=840; % Elongation=53; Tear Resistance of 44. The resultant elastomeric film was fully cured and did not require any covering to prevent oxygen inhibition.

TABLE 23

| Ingredient | Amount (% by weight) |
| --- | --- |
| 2513 | 54.88 |
| 2491 | 1.08 |
| 754 | 0.99 |
| SR-506 | 43.05 |
| Formulation Results | |
| PVC | 0 |
| Weight Solids | 100 |
| P/B | 0 |
| Volume Solids | 100 |
| VOC | 0 |

Example 24

An aliphatic oligomer was prepared using I (104.93 grams), 1035-55 (159.26 grams), M100 (214.85 grams), SR-506 (320 grams), T-9 (0.16 grams), and BHT (0.8 grams). The oligomer was prepared by adding isocyanate, polyol and about 25% of the total catalyst charge to a reaction flask with a nitrogen pad attached. Stirring was begun and the temperature set to about 80° C. for 1 hour. The remaining catalyst was then charged and the contents heated to 100° C. The reaction was continued at 100° C. until the theoretical % NCO of the allophonate step had been reached. The reactor contents were cooled to <70° C. The nitrogen pad was removed and the reaction exposed to dry air. The stabilizer and reactive diluent was added to the reactor flask. Then, the hydroxyl acrylate was added to the reactor flask while keeping the temperature of the reactor <70° C. Once all of the hydroxyl acrylate had been added the temperature was maintained until the % NCO was 50.5%.

A UV curable composition was prepared using the components in Table 24.

The composition was prepared by adding the oligomer with 2022 into a mixer and mixing the components until a homogeneous solution was achieved. This composition was then drawn down onto a 24 inch by 24 inch glass plate and then exposed to a Fusion Light Hammer UV processor at a line speed of 10 feet per minute. The UV light exposure was at an intensity 4.4 UV A, 2.7 UV B, 0.4 UV C and 11.5 UVV Joules per cm$^2$. The specific UV light configuration was V bulb and then H bulb. The resultant elastomeric film had the following properties; Tensile=2,420; % Elongation=88; Tear Resistance of 297. The resultant elastomeric film was fully cured and did not require any covering to prevent oxygen inhibition.

TABLE 24

| Ingredient | Amount (% by weight) |
| --- | --- |
| Oligomer of Example 24 | 97.09 |
| 2022 | 2.91 |
| Formulation Results | |
| PVC | 0 |
| Weight Solids | 100 |
| P/B | 0 |
| Volume Solids | 100 |
| VOC | 0 |

Example 25

An aliphatic oligomer was produced using the procedure of Examples 8-10 and 14-16 using H (68.08 grams), 3400 (68.08 grams), 1035-55 (313.56 grams), SR-495 (293.07 grams), SR-506 (82.72 grams), T-12 (0.83 grams), and BHT (0.83 grams). A UV curable composition was prepared using the components in Table 25.

TABLE 25

| Ingredient | Amount (% by weight) |
| --- | --- |
| Oligomer of Example 25 | 97.09 |
| 2022 | 2.91 |
| Formulation Results | |
| PVC | 0 |
| Weight Solids | 100 |
| P/B | 0 |
| Volume Solids | 100 |
| VOC | 0 |

The composition was prepared by adding the oligomer and 2022 into a mixer and mixing the components until a homogeneous solution was achieved. This composition was then drawn down onto a 24 inch by 24 inch glass plate and then exposed to a Fusion Light Hammer UV processor at a line speed of 10 feet per minute. The UV light exposure was at an intensity 4.4 UV A, 2.7 UV B, 0.4 UV C and 11.5 UVV Joules per cm$^2$. The specific UV light configuration was V bulb and then H bulb. The resultant UV cured elastomeric film had the following properties: Tensile=197; % Elongation=16; Tear Resistance of 17. The resultant elastomeric film was fully cured and did not require any covering to prevent oxygen inhibition.

Example 26

An aliphatic oligomer was prepared using I (13.71 parts by weight), 105-55 (12.49 parts by weight), SR-506 (40.0 parts by weight), T-9 (0.2 parts by weight), M100 (33.69 parts by weight) and BHT (0.1 parts by weight) using the procedure described in Example 24. A UV curable composition was prepared using the ingredients in Table 26.

TABLE 26

| Ingredients | Amount (% by weight) |
| --- | --- |
| Oligomer of Example 26 | 97.09 |
| 2022 | 2.91 |
| Formulation Results | |
| PVC | 0 |
| Weight Solids | 100 |
| P/B | 0 |
| Volume Solids | 100 |
| VOC | 0 |

The composition was prepared by adding the oligomer and 2022 into a mixer and mixing the components until a homogeneous solution was achieved. This composition was then drawn down onto a 24 inch by 24 inch glass plate and then exposed to a Fusion Light Hammer UV processor at a line speed of 10 feet per minute. The UV light exposure was at an intensity 4.4 UV A, 2.7 UV B, 0.4 UV C and 11.5 UVV Joules per cm$^2$. The specific UV light configuration was V bulb and then H bulb. The resultant elastomeric film had the following properties: Tensile=2,151; % Elongation=77; Tear Resistance of 186. The resultant elastomeric film was fully cured and did not require any covering to prevent oxygen inhibition.

Example 27

A UV curable composition was prepared using the components in Table 27.

TABLE 27

| Ingredient | Amount (% by weight) |
| --- | --- |
| Oligomer of Example 26 | 97.09 |
| 4265 | 2.91 |
| Formulation Results | |
| PVC | 0 |
| Weight Solids | 100 |
| P/B | 0 |
| Volume Solids | 100 |
| VOC | 0 |

The composition was prepared by adding the oligomer and 4265 into a mixer and mixing the components until a homogeneous solution was achieved. This composition was then drawn down onto a 24 inch by 24 inch glass plate and then exposed to a Fusion Light Hammer UV processor at a line speed of 10 feet per minute. The UV light exposure was at an intensity 4.4 UV A, 2.7 UV B, 0.4 UV C and 11.5 UVV Joules per cm$^2$. The specific UV light configuration was V bulb and then H bulb. The film had the following properties: Tensile=2,613; % Elongation=65; Tear Resistance of 427. The resultant elastomeric film was fully cured and did not require any covering to prevent oxygen inhibition.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

The invention claimed is:

1. A method of making a high thickness elastomer, comprising:
    (I) applying an actinic radiation curable composition to a substrate at a thickness of at least 50 mils;
    (II) exposing the composition to actinic radiation to produce a cured film; and
    (III) removing the film from the substrate,
    wherein the elastomer thereby obtained is substantially free from uncured surface residue even if no oxygen inhibition mitigation technique is used in the method, and
    wherein the composition comprises up to 70 percent by weight of (a)(1) and at least 30 percent by weight of at least one selected from the group consisting of (a)(2) and (a)(3) based on a total weight of (a)(1), (a)(2) and (a)(3), and (b) a photoinitiator,
    wherein (a)(1) is a urethane (meth)acrylate polymer which is a reaction product of a composition comprising:
        (i) an organic polyisocyanate,
        (ii) a polyol having a number average molecular weight of from 600 to 4000 g/mol, and
        (iii) at least one selected from the group consisting of:
            (A) a hydroxyl-functional (meth)acrylate, and
            (B) an unsaturated (meth) acrylate polyol based on at least one selected from the group consisting of a polyester, a polyether, a polythioether, a polyacetal, a polycarbonate, a dimer fatty alcohol and an esteramide, and having a number average molecular weight of 400 to 8000 g/mol,
        at an isocyanate to hydroxyl equivalent ratio of from 0.5:1 to 1:0.5;
    wherein (a)(2) is an allophanate urethane (meth)acrylate polymer; and
    wherein (a)(3) is a lactone-containing (meth)acrylate polymer.

2. The method of claim 1, wherein the composition comprises a reaction product of a composition comprising (a)(1)(i), (a)(1)(ii), and (a)(1)(iii)(B).

3. The method of claim 1, wherein the urethane (meth)acrylate polymer (a)(1) is a tri- or higher functional urethane (meth)acrylate.

4. The method of claim 3, wherein the polyol (a)(1)(ii) comprises a triol; and/or wherein the composition is substantially 100% solids.

5. The method of claim 1,
    wherein the composition comprises the urethane (meth)acrylate polymer (a)(1), and at least one selected from the group consisting of the allophanate unsaturated urethane (meth)acrylate (a)(2) and the lactone-containing (meth)acrylate (a)(3),
    wherein the allophanate unsaturated urethane (meth)acrylate (a)(2) is different from the urethane (meth)acrylate polymer (a)(1), and the lactone-containing (meth)acrylate (a)(3) is different from the urethane (meth)acrylate polymer (a)(1) and the allophanate unsaturated urethane (meth)acrylate (a)(2).

6. The method of claim 5, wherein the polyol (a)(1)(ii) comprises a triol; and/or wherein the composition is substantially 100% solids.

7. The method of claim 1, wherein the polyol (a)(1)(ii) comprises a triol; and/or wherein the composition is substantially 100% solids.

8. A composition comprising:
    (a) up to 70 percent by weight, based on the total weight of (a) and (b), of an unsaturated (meth)acrylate polymer or oligomer which is the reaction product of a composition comprising:
        (i) an organic polyisocyanate,
        (ii) a polyol having a number average molecular weight of from 600 to 4000 g/mol, and
        (iii) at least one selected from the group consisting of:
            (1) a hydroxyl-functional (meth)acrylate, and
            (2) an unsaturated (meth)acrylate polyol based on at least one selected from the group consisting of a polyester, a polyether, a polythioether, a polyacetal, a polycarbonate, a dimer fatty alcohol and an esteramide, in each case with a number average molecular weight of 400 to 8000 g/mol,
        at an isocyanate to hydroxyl equivalent ratio of from 0.5:1 to 1:0.5;
    (b) at least 30 percent by weight, based on the total weight of the sum of (a) and (b), of at least one selected from the group consisting of:
        (i) an allophanate unsaturated urethane (meth)acrylate, different from component (a); and
        (ii) a lactone-containing (meth)acrylate different from (a) and (b)(i); and
    (c) a photoinitiator.

9. The composition of claim 8, wherein the polyol (a)(ii) comprises a triol.

10. The composition of claim 9, wherein the triol comprises a polyester polyol.

11. The composition of claim 8, wherein the composition is substantially 100% solids.

* * * * *